(12) United States Patent
Akiyama

(10) Patent No.: US 10,915,014 B1
(45) Date of Patent: Feb. 9, 2021

(54) ILLUMINATION OPTICAL DEVICE AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/004,322

(22) Filed: Aug. 27, 2020

(30) Foreign Application Priority Data

Aug. 28, 2019 (JP) .................................. 2019-155867

(51) Int. Cl.
| | |
|---|---|
| G03B 21/20 | (2006.01) |
| H04N 9/31 | (2006.01) |
| G03B 33/12 | (2006.01) |
| G02B 5/30 | (2006.01) |
| G02B 27/28 | (2006.01) |

(52) U.S. Cl.
CPC ......... *G03B 21/208* (2013.01); *G02B 5/3083* (2013.01); *G02B 27/285* (2013.01); *G03B 21/204* (2013.01); *G03B 21/2013* (2013.01); *G03B 21/2066* (2013.01); *G03B 21/2073* (2013.01); *G03B 33/12* (2013.01); *H04N 9/3161* (2013.01); *H04N 9/3164* (2013.01); *H04N 9/3167* (2013.01)

(58) Field of Classification Search
CPC .............. G03B 21/2013; G03B 21/204; G03B 21/2066; G03B 21/2073; G03B 21/208; G02B 5/3083; G02B 27/285; H04N 9/3161; H04N 9/3164

USPC ........................................................... 353/20
See application file for complete search history.

(56) References Cited

U.S. PATENT DOCUMENTS

| | | | |
|---|---|---|---|
| 5,161,042 A | 11/1992 | Hamada | |
| 10,534,250 B2 * | 1/2020 | Akiyama | G03B 21/208 |
| 2015/0181179 A1 | 6/2015 | Yamamoto et al. | |
| 2016/0373704 A1 * | 12/2016 | Akiyama | H04N 9/3152 |

FOREIGN PATENT DOCUMENTS

| | | | |
|---|---|---|---|
| JP | H04-060538 A | 2/1992 | |
| JP | 2013-195501 A | 9/2013 | |
| JP | 2015-121597 A | 7/2015 | |
| JP | WO 2018/043247 A1 * | 3/2018 | ............... F21S 2/00 |

* cited by examiner

*Primary Examiner* — Jerry L Brooks
(74) *Attorney, Agent, or Firm* — Oliff PLC

(57) ABSTRACT

The illumination optical device includes a light source device and a homogenization device. The light source device includes a light source, a pair of multi-lenses having an incident side multi-lens and an exit side multi-lens, and configured to divide a light beam emitted from the light source into a plurality of first partial light beams, and an optical element on which the plurality of first partial light beams is superimposed, and which emits a diffused light beam. The homogenization device includes a pair of lens arrays having an incident side lens array and an exit side lens array, and dividing the diffused light beam into a plurality of second partial light beams, and a superimposing lens for superimposing the plurality of second partial light beams in the illumination target area.

8 Claims, 13 Drawing Sheets

FIG. 6
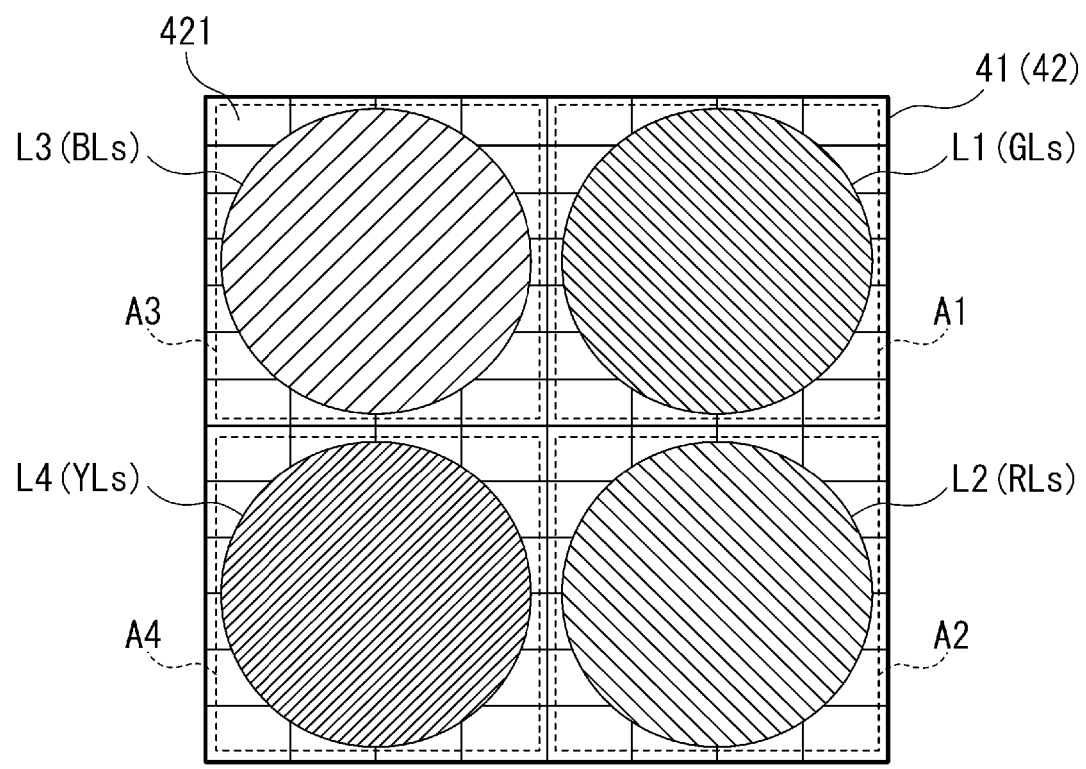
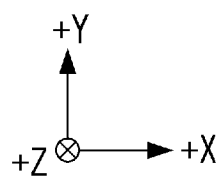

※ILLUMINATION OPTICAL DEVICE AND PROJECTOR

The present application is based on, and claims priority from JP Application Serial Number 2019-155867, filed Aug. 28, 2019, the disclosure of which is hereby incorporated by reference herein in its entirety.

BACKGROUND

1. Technical Field

The present disclosure relates to an illumination optical device and a projector.

2. Related Art

In the past, there has been known a projector which modulates light beam emitted from a light source to form an image corresponding to image information, and then projects the image thus formed. As such a projector, there has been known a single-panel projector which separates the light beam emitted from a white light source into a plurality of colored light beams, and then makes the colored light beams thus separated respectively enter the corresponding sub-pixels to thereby perform color display (see, e.g., JP-A-4-60538 (Document 1)).

In the projector described in Document 1, a red-light reflecting dichroic mirror, a green-light reflecting dichroic mirror, and a blue-light reflecting dichroic mirror are arranged along the incident light axis of the light beam emitted from the light source in a state of being nonparallel to each other. Thus, the light beam emitted from the light source is separated into a red light beam, a green light beam, and a blue light beam having respective proceeding directions slightly different from each other on the same plane. The red light beam, the green light beam, and the blue light beam thus separated into are each collected by a microlens disposed on the incident side of a light modulation element, and then respectively enter red sub-pixels, green sub-pixels, and blue sub-pixels of the light modulation element.

In recent years, in the projectors, there increases a demand for achieving a high luminance projection image.

Based on such a demand, there has been demanded an illumination optical device capable of increasing the use efficiency of the light beam emitted from the light source.

SUMMARY

An illumination optical device according to a first aspect of the present disclosure includes a light source device, and a homogenization device configured to substantially homogenously illuminate an illumination target area with a light beam emitted from the light source device, wherein the light source device includes a light source, a pair of multi-lenses configured to divide a light beam emitted from the light source into a plurality of first partial light beams, and an optical element which the plurality of first partial light beams enters in a superimposed manner, and which is configured to emit a diffused light beam, the pair of multi-lenses include an incident side multi-lens located at a light incident side and having a plurality of first lenses, and an exit side multi-lens located at a light exit side and having a plurality of second lenses, the homogenization device includes a pair of lens arrays configured to divide the diffused light beam emitted from the optical element into a plurality of second partial light beams, and a superimposing lens configured to superimpose the plurality of second partial light beams in the illumination target area, the pair of lens arrays include an incident side lens array located at a light incident side and having a plurality of third lenses, and an exit side lens array located at a light exit side and having a plurality of fourth lenses, the incident side multi-lens and the optical element are in a conjugate relation, the optical element and the exit side lens array are in a conjugate relation, and a shape of each of the first lenses and a shape of each of the fourth lenses are in a similarity relationship.

In the first aspect described above, the optical element may be a diffuser element configured to emit the diffused light beam obtained by diffusing an incident light beam.

In the first aspect described above, the optical element may be a wavelength conversion element which includes a phosphor material, and is configured to emit the diffused light beam longer in wavelength than an incident light beam.

In the first aspect described above, the light source device may include a first polarization split element configured to transmit a first polarization component toward a first direction, and reflect a second polarization component toward a second direction perpendicular to the first direction out of a source light beam which is emitted from the light source, and enters the first polarization split element along the first direction via the pair of multi-lenses, a second polarization split element located at the first direction side of the first polarization split element, and configured to reflect the first polarization component of the source light beam entering the second polarization split element in the first direction toward the second direction, a first reflecting element located at the second direction side of the first polarization split element, and configured to reflect the source light beam entering the first reflecting element toward an opposite direction to the second direction, a first retardation element located between the first polarization split element and the first reflecting element in the second direction, and configured to convert a polarization state of the source light beam, a wavelength conversion element located at the second direction side of the second polarization split element, and configured to emit a converted light beam as unpolarized light, which is obtained by performing wavelength conversion on the first polarization component of the source light beam entering the wavelength conversion element in the second direction, toward the opposite direction to the second direction, a second retardation element which is a ½ wave plate which is located at the opposite direction side to the second direction side of the second polarization split element, and which the converted light beam transmitted through the second polarization split element enters, a first color separation element located at the opposite direction side to the second direction side of the second retardation element, and configured to separate the converted light entering the first color separation element from the second retardation element into a first colored light beam and a second colored light beam, a second color separation element located at the opposite direction side to the second direction side of the first polarization split element, and configured to separate a light beam entering the second color separation element in the opposite direction to the second direction from the first polarization split element into a third colored light beam and a fourth colored light beam, and a third retardation element which is a ½ wave plate located in a light path of the third colored light beam separated by the second color separation element, the second polarization split element may transmit the first polarization component of the converted light beam in the opposite direction to the second direction to make the first polarization component enter the second retardation element, and may reflect the second polarization component of the converted light beam toward an opposite direction to the first direction out of the converted light beam entering the second polarization split element in the opposite direction to the second direction, the first polarization split element may transmit the first polarization component of the source light beam entering the first polarization split element in the opposite direction to the second direction toward the opposite direction to the second direction to thereby make the first polarization component enter the second color separation element, and may reflect the second polarization component of the converted light beam entering the first polarization split element in the opposite direction to the first direction toward the opposite direction to the second direction to thereby make the second polarization component enter the second color separation element, the first color separation element may emit a first color component included in the second polarization component of the converted light beam entering the first color separation element from the second retardation element as the first colored light beam, and may emit a second color component included in the second polarization component of the converted light beam as the second colored light beam, the second color separation element may emit the first polarization component of the source light beam entering the second color separation element from the first polarization split element to the third retardation element as the third colored light beam, and may emit the second polarization component of the converted light beam entering the second color separation element from the first polarization split element as the fourth colored light beam, and the first reflecting element and the wavelength conversion element may each be the optical element.

In the first aspect described above, a shape of the wavelength conversion element when viewed from the light incident side may have a similarity relationship with a shape of a light beam entering the wavelength conversion element when viewed from the light incident side, and a size of the wavelength conversion element when viewed from the light incident side may substantially coincide with a beam diameter of a light beam entering the wavelength conversion element when viewed from the light incident side.

In the first aspect described above, a shape of each of the first lenses and a shape of each of the second lenses may be in a similarity relationship, and a shape of each of the third lenses and a shape of each of the fourth lenses may be in a similarity relationship.

In the first aspect described above, the incident side multi-lens and the exit side multi-lens may be multi-lenses having a same configuration, and the incident side lens array and the exit side lens array may be lens arrays having a same configuration.

A projector according to a second aspect of the present disclosure includes the illumination optical device described above, a light modulation device having a modulation area configured to modulate the light beam emitted from the illumination optical device, and a projection optical device configured to project the light beam modulated by the light modulation device, wherein the modulation area is the illumination target area.

In the second aspect described above, a shape of the modulation area may have a similarity relationship with a shape of each of the first lenses.

BRIEF DESCRIPTION OF THE DRAWINGS

FIG. 6 is a schematic diagram showing incident positions of the colored light beams in an incident side lens array in the first embodiment.

DESCRIPTION OF EXEMPLARY EMBODIMENTS

First Embodiment

A first embodiment of the present disclosure will hereinafter be described based on the drawings.
Schematic Configuration of Projector FIG. 1 is a schematic diagram showing an internal configuration of a projector 1A according to the present embodiment.

The projector 1A according to the present embodiment is for modulating the light beams emitted from a light source device 2 to form an image corresponding to image information, and then projecting the image thus formed on a projection target surface such as a screen in an enlarged manner. Specifically, the projector 1A is a so-called single-panel projector, and modulates the light beams emitted from the light source device 2 with a single light modulation device 6 having a single liquid crystal panel 61 to thereby form an image, and then projects the image thus formed.

Figure 1:
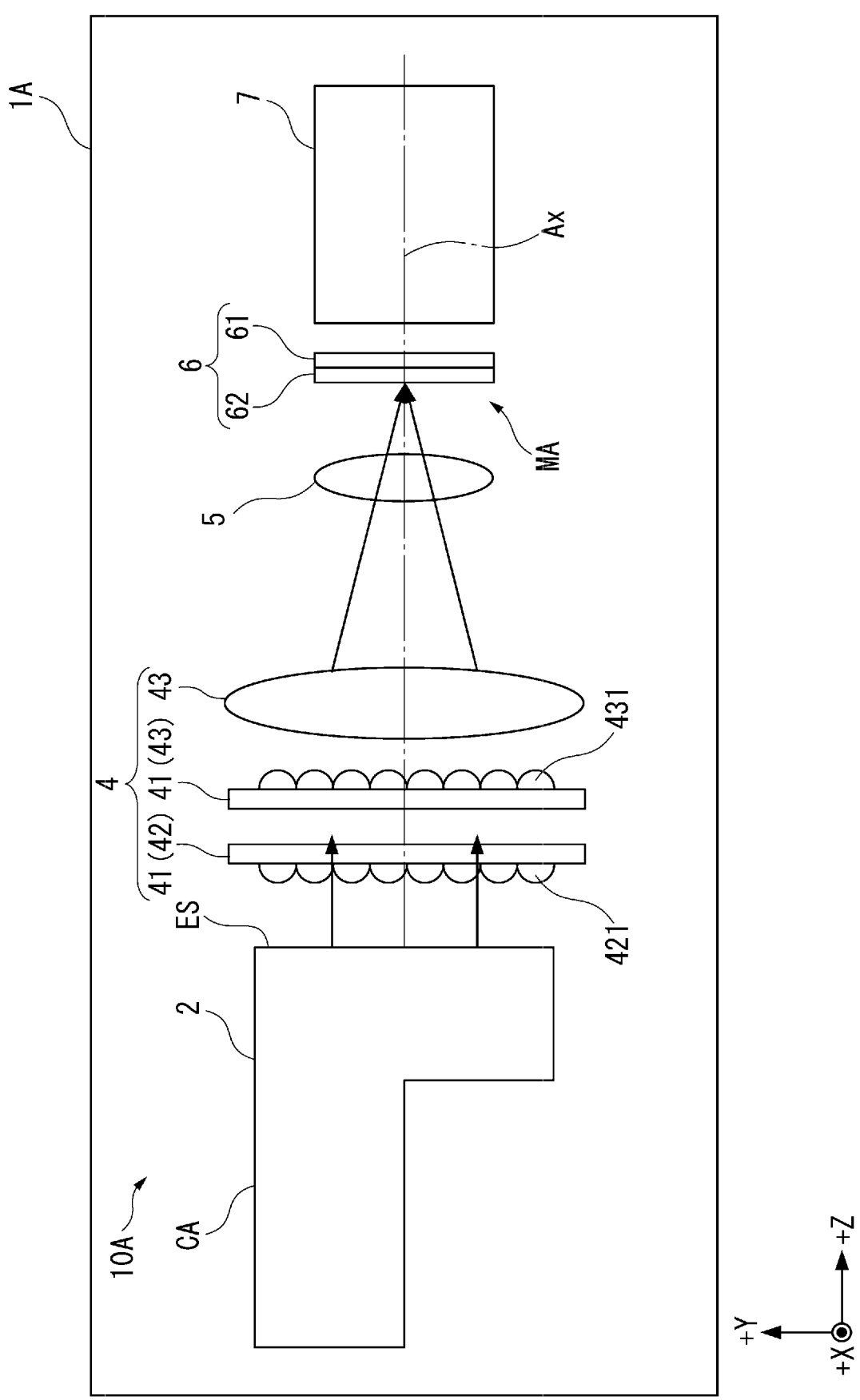
FIG. 1 is a schematic diagram showing an internal configuration of a projector according to a first embodiment.

As shown in FIG. 1, the projector 1A is provided with the light source device 2, a homogenization device 4, a field lens 5, the light modulation device 6, and a projection optical device 7, wherein these constituents are disposed at predetermined positions on an illumination light axis Ax preset in the projector 1A.

It should be noted that the light source device 2 and the homogenization device 4 constitute an illumination optical device 10A, and the illumination optical device 10A illuminates a modulation area MA as an image formation area in the light modulation device 6 disposed in the illumination target area. In other words, the illumination optical device 10A illuminates the modulation area MA as the illumination target area.

In the following description, a direction in which the light source device 2 emits the light beams along the illumination light axis Ax is defined as a +Z direction, and two directions perpendicular to the +Z direction and perpendicular to each other are defined as a +X direction and a +Y direction. In these directions, the +Y direction is defined as an upper direction in the projector 1A. Further, the +X direction is defined as a right-hand direction when viewing an object which the light enters along the +Z direction so that the +Y direction points the upper side. Although not shown in the drawings, an opposite direction to the +X direction is defined as a −X direction, an opposite direction to the +Y direction is defined as a −Y direction, and an opposite direction to the +Z direction is defined as a −Z direction.

It should be noted that the +X direction corresponds to a first direction, and the −Z direction corresponds to a second direction.

Configuration of Light Source Device

The light source device 2 emits light beams as single-species linearly polarized light. Specifically, the light source device 2 emits colored light beams which are the linearly polarized light beams polarized in the same polarization direction and are spatially separated from each other from respective exit positions different from each other toward the +Z direction.

The light source device 2 has a chassis CA as a light source device chassis for housing optical components constituting the light source device 2 inside. The colored light beams to be emitted from the light source device 2 are emitted from an exit surface ES located at the +Z direction side in the chassis CA, and opposed to the homogenization device 4 in the chassis CA.

Figure 2:
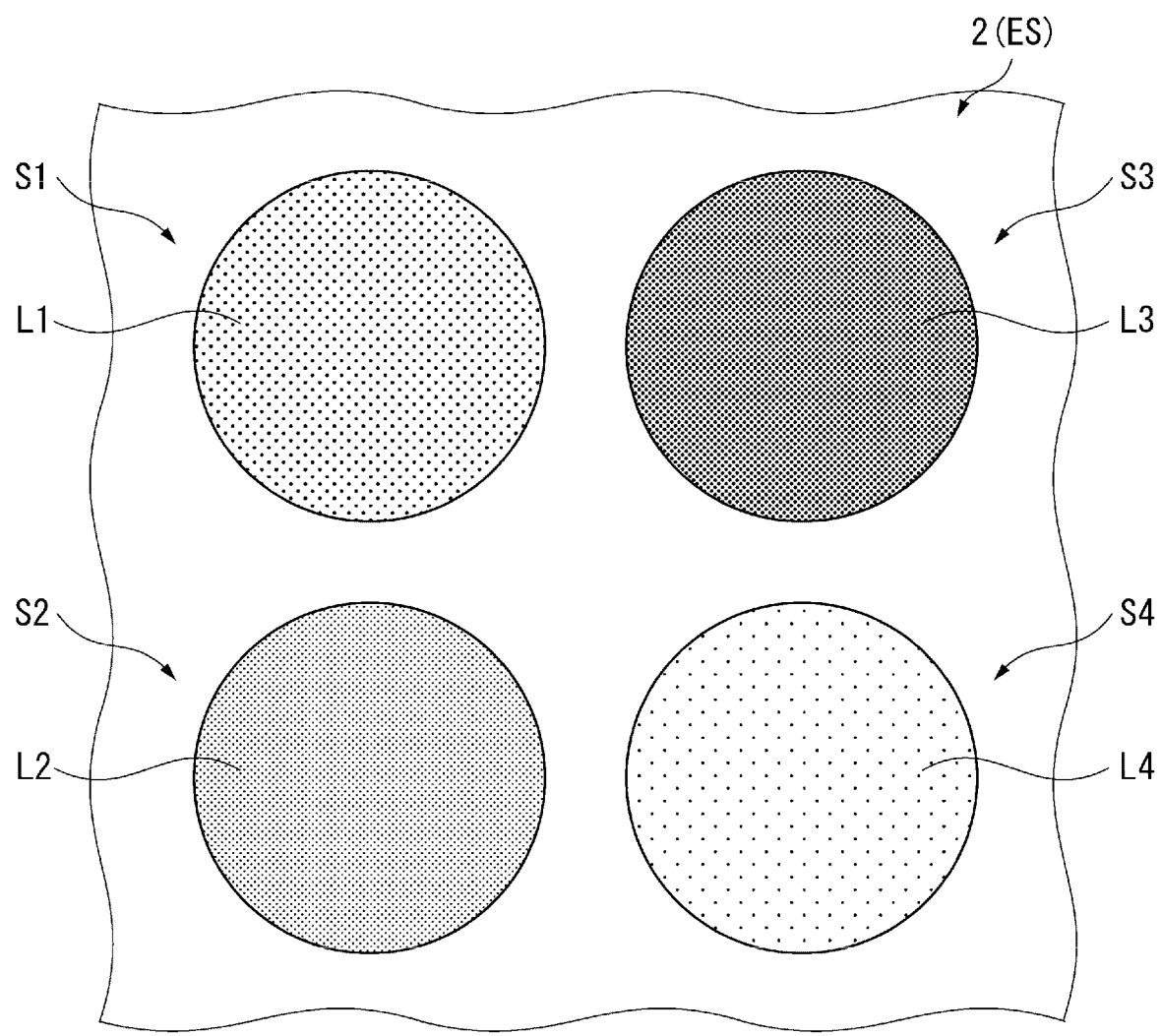
FIG. 2 is a diagram showing exit positions of respective colored light beams emitted from a light source device in the first embodiment.

FIG. 2 is a diagram showing exit positions of the plurality of colored light beams L1 through L4 in the light source device 2. In other words, FIG. 2 is a diagram of the exit surface ES of the light source device 2 viewed from the +Z direction.

Specifically, as shown in FIG. 2, the light source device 2 emits the first colored light beam L1 from a first exit position S1 in the exit surface ES. The light source device 2 emits the second colored light beam L2 from a second exit position S2 located at the −Y direction side of the first exit position S1 in the exit surface ES. The light source device 2 emits the third colored light beam L3 from a third exit position S3 located at the −X direction side of the first exit position S1 in the exit surface ES. The light source device 2 emits the fourth colored light beam L4 from a fourth exit position S4 located at the −Y direction side of the third exit position S3 in the exit surface ES.

In the present embodiment, the first colored light beam L1 is a green light beam, the second colored light beam L2 is a red light beam, the third colored light beam is a blue light beam, and the fourth colored light beam is a yellow light beam.

Figure 3:
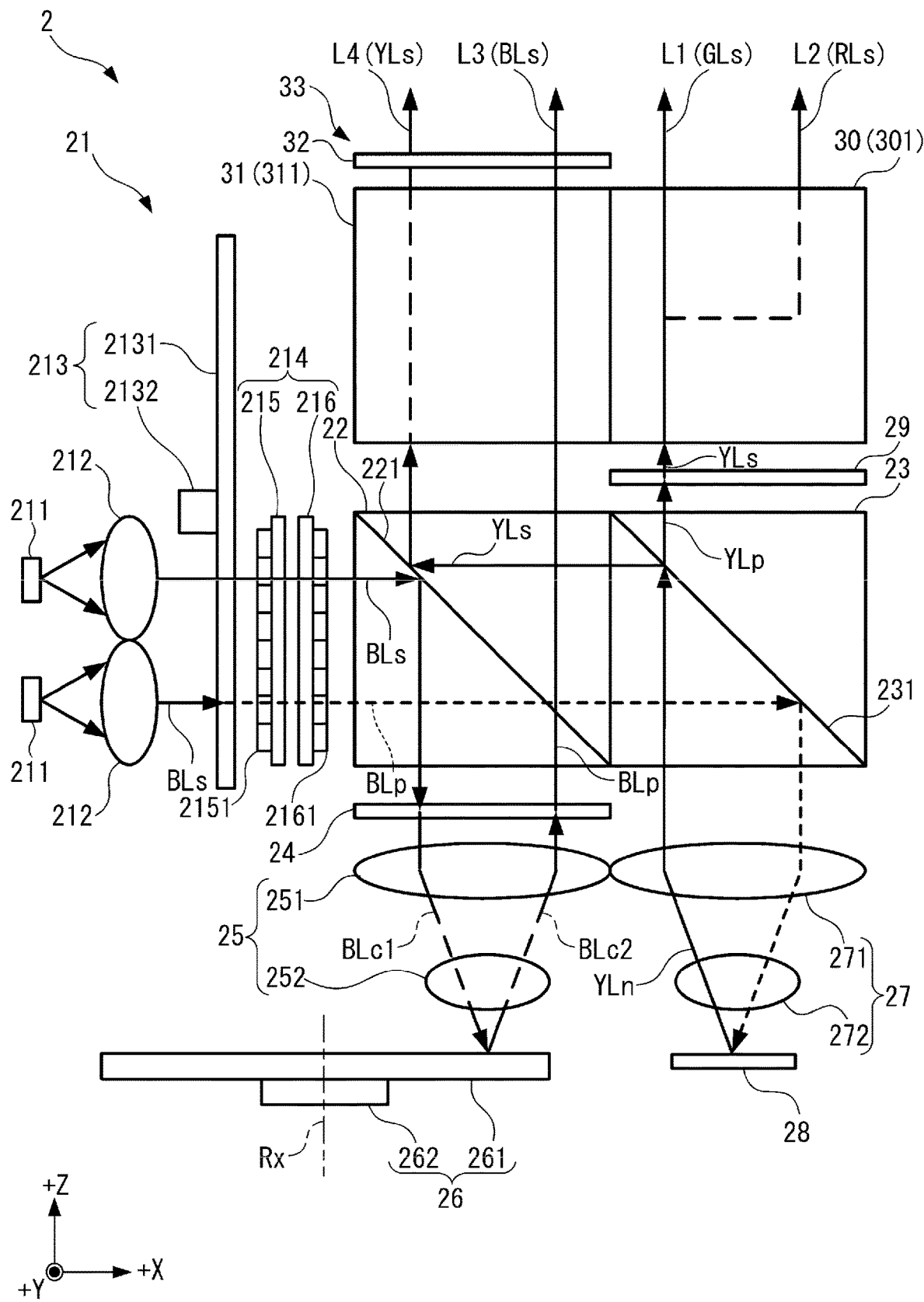
FIG. 3 is a schematic diagram showing a configuration of a light source device in the first embodiment.

FIG. 3 is a schematic diagram showing a configuration of the light source device 2. In other words, FIG. 3 is a plan view of the light source device 2 viewed from the +Y direction.

As shown in FIG. 3, the light source device 2 has a light source section 21, a first polarization split element 22, a second polarization split element 23, a first retardation element 24, a first light collection element 25, a first reflecting element 26, a second light collection element 27, a wavelength conversion element 28, a second retardation element 29, a first color separation element 30, a second color separation element 31, a third retardation element 32, and a second reflecting element 33.

Configuration of Light Source Section

The light source section 21 emits a source light beam toward the +X direction. The light source section 21 has light sources 211, collimator lenses 212, a rotary retardation device 213, and a pair of multi-lenses 214.

The light source 211 is a solid-state light source for emitting the blue light beam. Specifically, the light sources 211 are each a semiconductor laser for emitting the blue light beam BLs as the s-polarized light to a polarization split layer 221 of the first polarization split element 22 and a polarization split layer 231 of the second polarization split element 23. The blue light beam BLs emitted by the light source 211 is a laser beam having a peak wavelength of, for example, 450 through 460 nm.

The collimator lenses 212 collimate the light beams emitted from the light sources 211, respectively.

The rotary retardation device 213 has a retardation element 2131, and a rotating device 2132 for rotating the retardation element 2131 centering on a rotational axis parallel to the +X direction.

The retardation element 2131 corresponds to a fourth retardation element, and is one of a ½ wave plate and a ¼ wave plate. A part of the blue light beam BLs having entered the retardation element 2131 via the collimator lens 212 is converted into a blue light beam BLp as p-polarized light while passing through the retardation element 2131. Therefore, the blue light beam having been transmitted through the retardation element 2131 turns to light in which the blue light beam BLs as the original light and the blue light beam BLp mixed with each other at a predetermined rate.

Further, by the rotating device 2132 adjusting the rotational angle of the retardation element 2131, the ratio between the blue light beam BLs and the blue light beam BLp included in the blue light beam having been transmitted through the retardation element 2131 is adjusted. It should be noted that the rotating device 2132 for rotating the retardation element 2131 can be eliminated.

As described above, the light source section 21 emits the source light beam including the blue light beam BLp, which is a first polarization component, and is the p-polarized light with respect to the polarization split layer 221 of the first polarization split element 22 and the polarization split layer 231 of the second polarization split element 23, and the blue light beam BLs, which is a second polarization component, and is the s-polarized light with respect to the polarization split layer 221 of the first polarization split element 22 and the polarization split layer 231 of the second polarization split element 23.

It should be noted that the light source 211 has a configuration of emitting the blue light beam BLs, but can have a configuration of emitting the blue light beam BLp. Further, it is also possible for the light source 211 to have a configuration of emitting both of the blue light beam BLs and the blue light beam BLp. In this case, the rotary retardation device 213 can be eliminated. Further, it is also possible for the light source 211 to be provided with another solid-state light source such as LED (Light Emitting Diode) instead of the semiconductor laser.

In the present embodiment, when the s-polarized light is mentioned, it means the s-polarized light with respect to the polarization split layer 221 of the first polarization split element 22 and the polarization split layer 231 of the second polarization split element 23. Similarly, when the p-polarized light is mentioned, it means the p-polarized light with respect to the polarization split layer 221 of the first polarization split element 22 and the polarization split layer 231 of the second polarization split element 23.

In the present embodiment, the p-polarized light corresponds to the first polarization component, and the s-polarized light corresponds to the second polarization component.

The pair of multi-lenses 214 are disposed between the retardation element 2131 and the first polarization split element 22. The pair of multi-lenses 214 are a so-called a homogenizer optical element, and divide the source light beam entering the pair of multi-lenses 214 from the retardation element 2131 into a plurality of partial light beams, and then make the plurality of partial light beams enter the first polarization split element 22. It should be noted that the plurality of partial light beams divided by the pair of multi-lenses 214 corresponds to a plurality of first partial light beams.

The pair of multi-lenses 214 are formed of an incident side multi-lens 215 located at the incident side of the light entering the pair of multi-lenses 213 from the retardation element 2131, and an exit side multi-lens 216 located at the light exit side as the opposite side to the retardation element 2131.

The incident side multi-lens 215 has a plurality of small lenses 2151 arranged in a matrix in an orthogonal plane with respect to the +X direction as a plurality of first lenses. The incident side multi-lens 215 divides the source light beam entering the incident side multi-lens 215 into a plurality of partial light beams with the plurality of small lenses 2151. The small lenses 2151 are formed to have the same shape as each other when viewed from the light incident side, and in the present embodiment, the small lenses 2151 are each formed to have a rectangular shape.

Although described later in detail, the incident side multi-lens 215 and the first reflecting element 26 are in a conjugate relation, and the incident side multi-lens 215 and the wavelength conversion element 28 are in a conjugate relation.

The exit side multi-lens 216 has a plurality of small lenses 2161 corresponding to the plurality of small lenses 2151. In other words, the exit side multi-lens 216 has the plurality of small lenses 2161 arranged in a matrix in an orthogonal plane with respect to the +X direction as a plurality of second lenses.

One of the small lenses 2151 of the incident side multi-lens 215 and one of the small lenses 2161 of the exit side multi-lens 216 correspond one-to-one to each other, and the partial light beam emitted from the one small lens 2151 enters the corresponding one of the small lenses 2161. The partial light beams having entered the respective small lenses 2161 enter the first polarization split element 22, and by extension, enter the first reflecting element 26 and the wavelength conversion element 28 in a superimposed manner.

It should be noted that in the present embodiment, the shape of each of the small lenses 2151 as the plurality of first lenses and the shape of each of the small lenses 2161 as the plurality of second lenses are in a similarity relationship. Further, the incident side multi-lens 215 and the exit side multi-lens 216 are multi-lenses having the same configuration.

Configuration of First Polarization Split Element

The blue light beams BLs, BLp as the source light beams enter the first polarization split element 22 along the +X direction from the exit side multi-lens 216.

The first polarization split element 22 is a prism-type polarization split element formed by combining two prism segments each shaped like a substantially isosceles right triangular prism with each other to have a substantially rectangular solid shape, and on the interface between the two prism segments, there is disposed the polarization split layer 221.

The polarization split layer 221 is tilted 45° with respect to the +X direction and the +Z direction. Specifically, the polarization split layer 221 is tilted 45° with respect to the X-Y plane and the Y-Z plane.

The polarization split layer 221 has a polarization split characteristic of transmitting the p-polarized light and reflecting the s-polarized light out of the incident light. Alternatively, the polarization split layer 221 has a wavelength-selective polarization split characteristic of transmitting the p-polarized light and reflecting the s-polarized light when the incident light is the blue light beam while reflecting the incident light irrespective of the polarization state when the incident light is light longer in wavelength than the blue light beam.

Therefore, the first polarization split element 22 transmits the blue light beam BLp as the first polarization component toward the +X direction, and reflects the blue light beam BLs as the second polarization component toward the −Z direction out of the source light beam entering the first polarization split element 22 in the +X direction.

It should be noted that the first polarization split element 22 is not limited to the prism-type polarization split element, but can be a plate-type polarization split element having the polarization split layer 221.

Configuration of Second Polarization Split Element

The second polarization split element 23 is located at the +X direction side of the first polarization split element 22. The blue light beam BLp having passed through the first polarization split element 22 enters the second polarization split element 23.

Similarly to the first polarization split element 22, the second polarization split element 23 is the prism-type polarization split element, and has the polarization split layer 231 disposed on an interface between two prism segments.

The polarization split layer 231 is tilted 45° with respect to the +X direction and the +Z direction. Specifically, the polarization split layer 231 is tilted 45° with respect to the X-Y plane and the Y-Z plane. Further, the polarization split layer 231 and the polarization split layer 221 are parallel to each other.

The polarization split layer 231 has a wavelength-selective polarization split characteristic of reflecting the blue light beam while reflecting the s-polarized light and transmitting the p-polarized light with respect to the light longer in wavelength than the blue light beam. Therefore, the second polarization split element 23 reflects the blue light beam BLp, which enters the second polarization split element 23 from the first polarization split element 22 in the +X direction, toward the −Z direction.

It should be noted that the second polarization split element 23 is not limited to the prism-type polarization split element, but can be a plate-type polarization split element having the polarization split layer 231.

Configuration of First Retardation Element

The first retardation element 24 is located at the −Z direction side of the first polarization split element 22. In other words, the first retardation element 24 is located between the first polarization split element 22 and the first reflecting element 26 in the +Z direction.

The first retardation element 24 is a ¼ wave plate, and the blue light beam BLs reflected by the first polarization split element 22 is converted by the first retardation element 24 into a blue light beam BLc1 as circularly polarized light, and then enters the first light collection element 25. In other words, the first retardation element 24 converts the polarization state of the blue light beam entering the first retardation element 24.

Configuration of First Light Collection Element

The first light collection element 25 is located between the first retardation element 24 and the first reflecting element 26 in the +Z direction.

The first light collection element 25 converges the blue light beam BLc1 entering the first light collection element 25 from the first retardation element 24 on the first reflecting element 26. Further, the first light collection element 25 collimates the blue light beam BLc2 entering the first light collection element 25 from the first reflecting element 26. It should be noted that although the first light collection element 25 has a configuration including two lenses 251, 252 in the example shown in FIG. 3, the number of the lenses constituting the first light collection element 25 does not matter.

Configuration of First Reflecting Element

The first reflecting element 26 is located at the −Z direction side of the first light collection element 25. In other words, the first reflecting element 26 is located at the −Z direction side of the first polarization split element 22. The first reflecting element 26 has the conjugate relation with the incident side multi-lens 215.

The first reflecting element 26 corresponds to an optical element which the plurality of partial light beams enters from the pair of multi-lenses 214 in a superimposed manner, and then emits diffused light based on the plurality of partial light beams entering the optical element. In other words, the first reflecting element 26 is a diffuser element for emitting the diffused light based on the incident light.

Specifically, the first reflecting element 26 diffuses the blue light beam BLc1, which enters the first reflecting element 26 from the first light collection element 25 in the −Z direction, toward the +Z direction while reflecting the blue light beam BLc1. The first reflecting element 26 is provided with a reflecting plate 261 for diffusing the incident light while reflecting the incident light, and a rotating section 262 for rotating the reflecting plate 261 centering on a rotational axis Rx parallel to the +Z direction.

The blue light beam BLc1 having entered the reflecting plate 261 is converted into the blue light beam BLc2 as circularly polarized light with an opposite rotational direction when being reflected by the reflecting plate 261 and emitted as diffused light.

The blue light beam BLc2 emitted from the first reflecting element 26 is collimated while passing through the first light collection element 25 in the +Z direction, and then enters the first retardation element 24 once again. Therefore, the blue light beam BLc2 entering the first retardation element 24 from the first light collection element 25 is converted by the first retardation element 24 not into the blue light beam BLs which enters the first retardation element 24 from the first polarization split element 22, but into the blue light beam BLp. The blue light beam BLp thus converted is transmitted through the first polarization split element 22 in the +Z direction, and then enters the second color separation element 31.

Configuration of Second Light Collection Element

The second light collection element 27 is located between the second polarization split element 23 and the wavelength conversion element 28 in the +Z direction.

The second light collection element 27 converges the blue light beam BLp reflected toward the −Z direction by the second polarization split element 23 on the wavelength conversion element 28. Further, the second light collection element 27 collimates the yellow light beam YLn entering the second light collection element 27 from the wavelength conversion element 28 in the +Z direction. It should be noted that although the second light collection element 27 has a configuration including two lenses 271, 272 in the example shown in FIG. 3, the number of the lenses constituting the second light collection element 27 does not matter.

Configuration of Wavelength Conversion Element

The wavelength conversion element 28 is located at the −Z direction side of the second light collection element 27. In other words, the wavelength conversion element 28 is located at the −Z direction side of the second polarization split element 23. The wavelength conversion element 28 has the conjugate relation with the incident side multi-lens 215.

The wavelength conversion element 28 corresponds to an optical element which the plurality of partial light beams enters divided by the pair of multi-lenses 214 in a superimposed manner, and then emits diffused light based on the plurality of partial light beams entering the optical element. Specifically, the wavelength conversion element 28 is excited by the incident light, and emits a converted light beam as light having a wavelength different from the wavelength of the incident light as the diffused light. Specifically, the wavelength conversion element 28 is a reflective wavelength conversion element for emitting the converted light beam toward the opposite direction to the incident direction of the light. In other words, the wavelength conversion element 28 emits the converted light beam obtained by converting the wavelength of the incident light toward the opposite direction to the incident direction of the light.

In the present embodiment, the wavelength conversion element 28 includes a yellow phosphor which is excited by the blue light beam to emit the yellow light beam, and the wavelength conversion element 28 diffusely emits the yellow light beam YLn, which has a wavelength longer than the wavelength of the blue light beam BLp entering the wavelength conversion element 28 in the −Z direction, toward the +Z direction as the converted light beam.

The yellow light beam YLn is light having a peak wavelength in a range of, for example, 500 nm through 700 nm, and is unpolarized light. In other words, the yellow light beam YLn is light including a green light component as a first color component and a red light component as a second color component, wherein the s-polarized light and the p-polarized light are mixed with each other in each of the components.

The shape of the wavelength conversion element 28 when viewed from the light incident side is similar to the shape of the light beam entering the wavelength conversion element 28 when viewed from the light incident side. Further, the size of the wavelength conversion element 28 when viewed from the light incident side is a size corresponding to the beam diameter of the light beam entering the wavelength conversion element 28 when viewed from the light incident side. Therefore, an incident area of the light beam in the wavelength conversion element 28 and an exit area of the yellow light beam YLn in the wavelength conversion element 28 substantially coincide with each other.

It should be noted that the light source device 2 can be provided with a rotating device for rotating the wavelength conversion element 28 centering on a rotational axis parallel to the +Z direction. In this case, it is possible to increase the heat radiation efficiency of the wavelength conversion element 28.

The yellow light beam YLn emitted while being diffused toward the +Z direction from the wavelength conversion element 28 is collimated by the second light collection element 27, and then enters the second polarization split element 23.

The polarization split layer 231 of the second polarization split element 23 has the wavelength-selective polarization split characteristic as described above. Therefore, out of the yellow light beam YLn having entered the polarization split layer 231, the yellow light beam YLs as the s-polarized light is reflected toward the −X direction by the polarization split layer 231, and then enters the first polarization split element 22. The polarization split layer 221 of the first polarization split element 22 has the polarization split characteristic of reflecting the yellow light beam YLs as described above. Therefore, the yellow light beam YLs having entered the polarization split layer 221 in the −X direction is reflected toward the +Z direction by the first polarization split element 22, and then enters the second color separation element 31.

In contrast, out of the yellow light beam YLn having entered the polarization split layer 231, the yellow light beam YLp as the p-polarized light is transmitted toward the +Z direction through the polarization split layer 231, and then enters the second retardation element 29.

Configuration of Second Retardation Element

The second retardation element 29 is located at the +Z direction side of the second polarization split element 23. The yellow light beam YLp having been transmitted through the second polarization split element 23 toward the +Z direction enters the second retardation element 29.

The second retardation element 29 is a ½ wave plate for converting the yellow light beam YLp having entered the second retardation element 29 into the yellow light beam YLs. The yellow light beam YLs thus converted enters the first color separation element 30.

Configuration of First Color Separation Element

Figure 4:
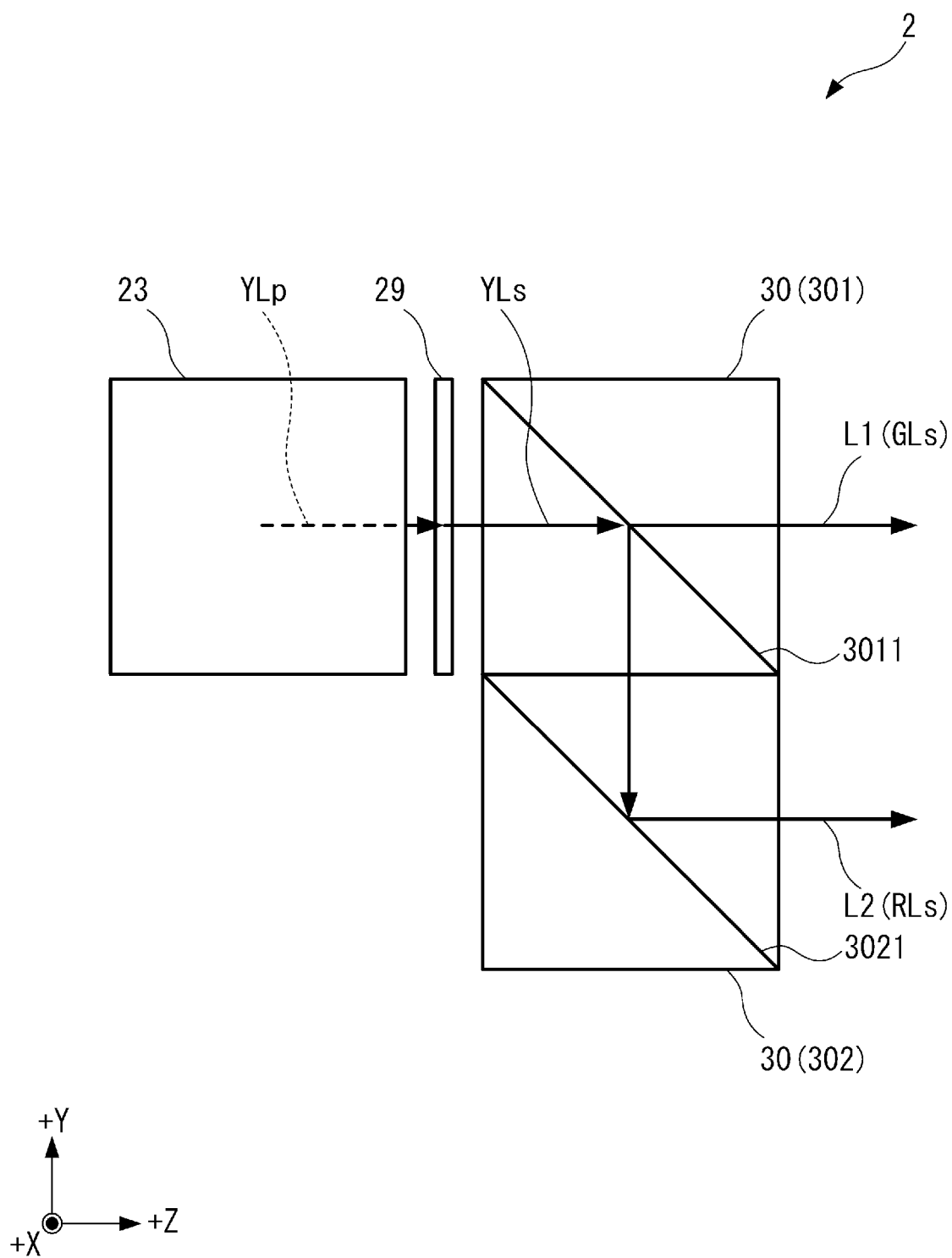
FIG. 4 is a schematic diagram of the light source device in the first embodiment viewed from a +X direction.

FIG. 4 is a schematic diagram of the light source device 2 viewed from the +X direction. In other words, FIG. 4 is a schematic diagram of the first color separation element 30 viewed from the +X direction. It should be noted that illustration of some of the constituents in the light source device 2 is omitted in FIG. 4.

As shown in FIG. 3 and FIG. 4, the first color separation element 30 is located at the +Z direction side of the second retardation element 29. The first color separation element 30 separates the green light beam GLs as the first color component and the red light beam RLs as the second color component from the yellow light beam YLs entering the first color separation element 30 from the second retardation element 29.

As shown in FIG. 4, the first color separation element 30 has a dichroic prism 301 and a reflecting prism 302.

The dichroic prism 301 is a prism-type color separation element formed by combining two prism segments each shaped like a substantially isosceles right triangular prism with each other to have a substantially rectangular solid shape, and on the interface between the two prism segments, there is disposed a color separation layer 3011.

The color separation layer 3011 is tilted 45° with respect to the +Y direction and the +Z direction. Specifically, the color separation layer 3011 is tilted 45° with respect to the X-Y plane and the X-Z plane.

The color separation layer 3011 transmits the green light component toward the +Z direction and reflects the red light component toward the −Y direction out of the incident light. Therefore, the green light beam GLs out of the yellow light beam YLs having entered the dichroic prism 301 is transmitted through the color separation layer 3011 toward the +Z direction to be emitted outside the dichroic prism 301. Then, the green light beam GLs is emitted from the light source device 2 toward the +Z direction as the first colored light beam L1, and then enters the homogenization device 4.

In contrast, the red light beam RLs out of the yellow light beam YLs having entered the dichroic prism 301 is reflected toward the −Y direction by the color separation layer 3011.

It should be noted that it is possible to adopt a dichroic mirror having the color separation layer 3011 instead of the dichroic prism 301.

The reflecting prism 302 is a prism-type reflecting element formed by combining two prism segments each shaped like a substantially isosceles right triangular prism with each other to have a substantially rectangular solid shape, and on the interface between the two prism segments, there is disposed a reflecting layer 3021 parallel to the color separation layer 3011.

The reflecting layer 3021 reflects the red light beam RLs, which enters the reflecting layer 3021 in the −Y direction from the color separation layer 3011, toward the +Z direction. The red light beam RLs having been reflected by the reflecting layer 3021 is emitted outside the reflecting prism 302. Then, the red light beam RLs is emitted from the light source device 2 toward the +Z direction as the second colored light beam L2, and then enters the homogenization device 4. In other words, the red light beam RLs is emitted as the second colored light beam L2 from the second exit position S2 located at the −Y direction side of the first exit position S1 from which the first colored light beam L1 is emitted.

It should be noted that it is possible to adopt a reflecting mirror having the reflecting layer 3021 instead of the reflecting prism 302.

Configuration of Second Color Separation Element

Figure 5:
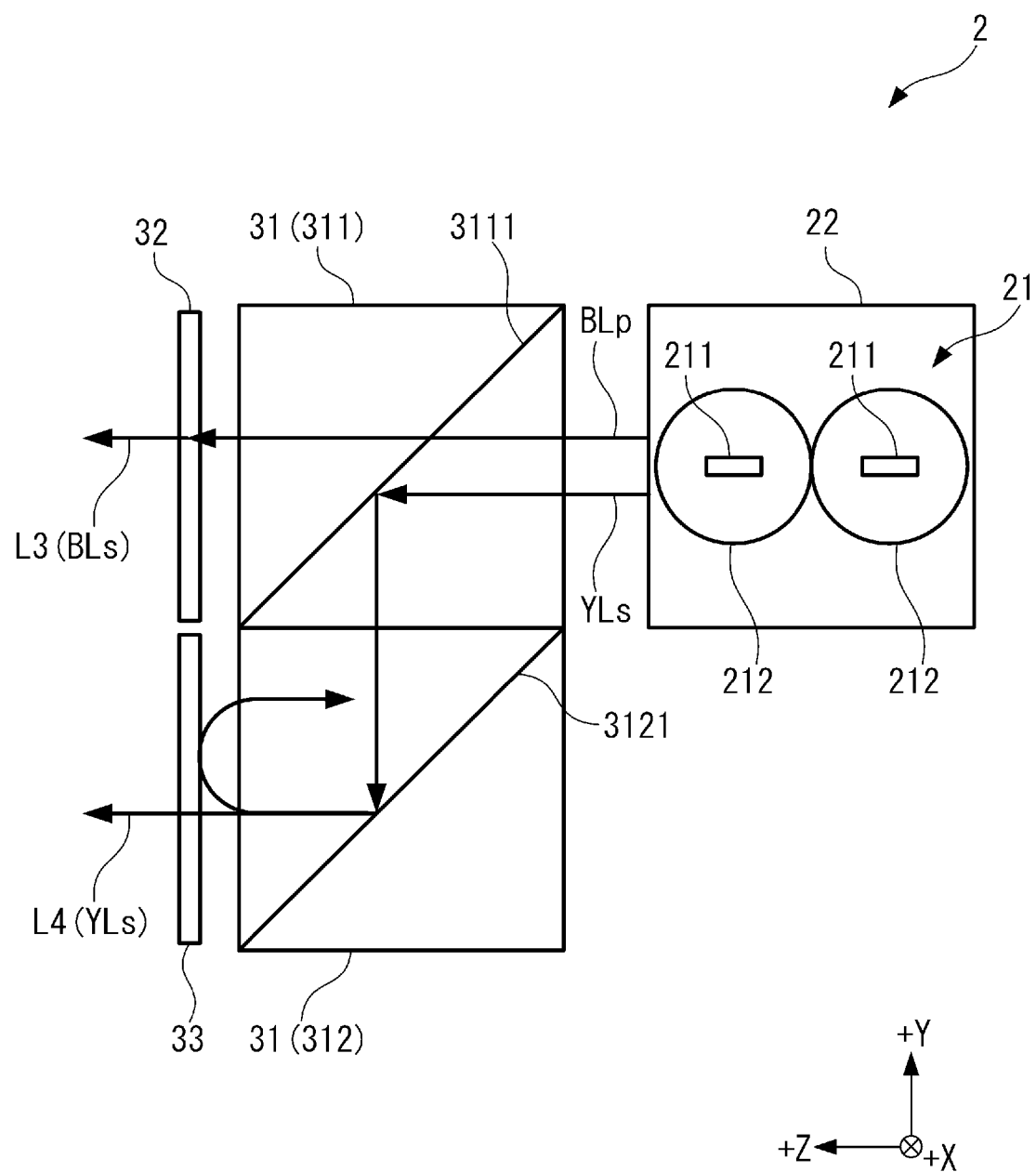
FIG. 5 is a schematic diagram of the light source device in the first embodiment viewed from a −X direction.

FIG. 5 is a schematic diagram of the light source device 2 viewed from the −X direction. In other words, FIG. 5 is a schematic diagram of the second color separation element 31, the third retardation element 32, and the second reflecting element 33 viewed from the −X direction. It should be noted that illustration of some of the constituents in the light source device 2 is omitted in FIG. 5.

The second color separation element 31 is located at the +Z direction side of the first polarization split element 22, and separates the blue light beam BLp and the yellow light beam YLs from the light entering the second color separation element 31 from the first polarization split element 22. As shown in FIG. 5, the second color separation element 31 has a dichroic prism 311 and a reflecting prism 312.

The blue light beam BLp and the yellow light beam YLs having been emitted from the first polarization split element 22 enter the dichroic prism 311. The dichroic prism 311 is a prism-type color separation element similar to the dichroic prism 301, and on the interface between the two prism segments, there is disposed a color separation layer 3111.

The color separation layer 3111 is tilted 45° with respect to the +Y direction and the +Z direction. Specifically, the color separation layer 3111 is tilted 45° with respect to the X-Y plane and the X-Z plane.

The color separation layer 3111 has a property of transmitting the blue light beam out of the incident light toward the +Z direction, and reflecting the colored light beams longer in wavelength than the blue light beam toward the −Y direction. Therefore, the blue light beam BLp out of the light beam having entered the dichroic prism 311 from the first polarization split element 22 is transmitted through the color separation layer 3111 toward the +Z direction to be emitted outside the dichroic prism 311. The blue light beam BLp enters the third retardation element 32.

In contrast, the yellow light beam YLs out of the light beam having entered the dichroic prism 311 from the first polarization split element 22 is reflected toward the −Y direction by the color separation layer 3111.

It should be noted that it is possible to adopt a dichroic mirror having the color separation layer 3111, or adopt a polarization split element having a polarization split layer for transmitting the p-polarized light and reflecting the s-polarized light instead of the dichroic prism 311.

The reflecting prism 312 is located at the −Y direction side of the dichroic prism 311. The yellow light beam YLs reflected by the color separation layer 3111 enters the reflecting prism 312.

The reflecting prism 312 has substantially the same configuration as that of the reflecting prism 302, and on the interface between the two prism segments, there is disposed a reflecting layer 3121.

The reflecting layer 3121 is tilted 45° with respect to the +Y direction and the +Z direction. Specifically, the reflecting layer 3121 is tilted 45° with respect to the X-Y plane and the X-Z plane. In other words, the reflecting layer 3121 is parallel to the color separation layers 3011, 3111 and the reflecting layer 3021.

The reflecting layer 3121 reflects the yellow light beam YLs entering the reflecting layer 3121 in the −Y direction from the dichroic prism 311 toward the +Z direction to make the yellow light beam YLs enter the second reflecting element 33.

It should be noted that it is possible to adopt a reflecting mirror having the reflecting layer 3121 instead of the reflecting prism 312.

Configuration of Third Retardation Element

The third retardation element 32 is disposed on the +Z direction side of the dichroic prism 311, and is located in the light path of the blue light beam BLp emitted from the dichroic prism 311. The third retardation element 32 is a ½ wave plate for conversing the polarization direction of the incident light, and converts the blue light beam BLp having entered the third retardation element 32 from the dichroic prism 311 into the blue light beam BLs.

The blue light beam BLs having been transmitted through the third retardation element 32 is emitted from the light source device 2 toward the +Z direction as the third colored light beam L3, and then enters the homogenization device 4. In other words, the blue light beam BLs having been transmitted through the third retardation element 32 is emitted from the third exit position S3 as the third colored light beam L3.

It should be noted that the third retardation element 32 can be disposed on a surface from which the blue light beam BLp is emitted in the dichroic prism 311.

Configuration of Second Reflecting Element

The second reflecting element 33 is disposed in a light path of the fourth colored light beam L4 emitted from the reflecting prism 312. The second reflecting element 33 transmits a part of the incident light, and reflects the rest of the incident light. Specifically, the second reflecting element 33 transmits the incident light in accordance with the predetermined ratio, and reflects the rest of the incident light. Therefore, a part of the yellow light beam YLs out of the yellow light beam YLs entering the second reflecting element 33 from the reflecting prism 312 is transmitted through the second reflecting element 33, and is then emitted toward the +Z direction from the light source device 2 as the fourth colored light beam L4 to enter the homogenization device 4. In other words, the yellow light beam YLs is spatially separated from the blue light beam BLs, and is emitted from the fourth exit position S4 on the −Y direction side of the third exit position S3 as the fourth colored light beam L4 to enter the homogenization device 4.

In contrast, the rest of the yellow light beam YLs having entered the second reflecting element 33 is reflected by the second reflecting element 33, and then enters the reflecting prism 312 once again. Then, the rest of the yellow light beam YLs having entered the reflecting prism 312 is reflected toward the +Y direction by the reflecting layer 3121, and then enters the wavelength conversion element 28 via the dichroic prism 311, the first polarization split element 22, the second polarization split element 23, and the second light collection element 27.

Here, the yellow phosphor included in the wavelength conversion element 28 hardly absorbs the yellow light beam having entered the wavelength conversion element 28 from the outside. Therefore, the yellow light beam YLs having entered the wavelength conversion element 28 is repeatedly reflected inside the wavelength conversion element 28 to thereby turn to the yellow light beam YLn as unpolarized light, and is then emitted outside the wavelength conversion element 28 together with the yellow light beam YLn generated in the yellow phosphor. Then, the yellow light beam YLn having been emitted from the wavelength conversion element 28 enters the second polarization split element 23 via the second light collection element 27 as described above.

In the present embodiment, the second reflecting element 33 is formed of a half mirror. The ratio between the light intensity of the yellow light beam YLs transmitted through the second reflecting element 33 and the light intensity of the yellow light beam YLs reflected by the second reflecting element 33 can be set in advance.

It should be noted that it is possible to adopt a third color separation element instead of the second reflecting element 33. The third color separation element can be made to transmit the first colored light component and reflect the second colored light component out of the incident light.

For example, when the third color separation element for transmitting the green light beam GLs included in the yellow light beam YLs entering the third color separation element and reflecting the red light beam RLs is disposed instead of the second reflecting element 33, the light source device 2 emits the green light beam GLs from the fourth exit position S4 to the homogenization device 4 as the fourth colored light beam L4.

In contrast, the red light beam RLs having been reflected by the third color separation element enters the reflecting prism 312 from the +Z direction. Further, the red light beam RLs enters the wavelength conversion element 28 via the second color separation element 31, the first polarization split element 22, the second polarization split element 23, and the second light collection element 27 similarly to the yellow light beam YLs reflected by the second reflecting element 33 in the light source device 2.

As described above, since the yellow phosphor included in the wavelength conversion element 28 hardly absorbs the yellow light beam having entered the wavelength conversion element 28 from the outside, the yellow phosphor does not absorb the red light beam RLs. Therefore, the red light beam RLs having entered the wavelength conversion element 28 is repeatedly reflected inside the wavelength conversion element 28 to thereby turn to a red light beam as unpolarized light, and is then emitted outside the wavelength conversion element 28 together with the yellow light beam YLn generated in the yellow phosphor.

Out of the red light beam emitted from the wavelength conversion element 28, the red light beam RLs as the s-polarized light is reflected by the third color separation element to return to the wavelength conversion element 28, but the red light beam as the p-polarized light is transmitted through the second polarization split element 23 toward the +Z direction to enter the second retardation element 29, and by extension, emitted outside the light source device 2 from the second exit position S2 as the second colored light beam L2.

Such a third color separation element can be formed of a dichroic mirror.

Configuration of Homogenization Device

The homogenization device 4 homogenously illuminates the light modulation device 6 with the light beams emitted from the light source device 2. In other words, the homogenization device 4 homogenizes the illuminance in the light modulation device 6 illuminated by the light beams emitted from the light source device 2. As shown in FIG. 1, the homogenization device 4 has a pair of lens arrays 41 and a superimposing lens 44.

Configuration of Pair of Lens Arrays

The pair of lens arrays 41 divide the light beams emitted from the light source device 2 into a plurality of partial light beams. In other words, the pair of lens arrays 41 divide the diffused light beams emitted from the first reflecting element 26 and the wavelength conversion element 28 as optical elements into the plurality of partial light beams. The pair of lens arrays 41 is constituted by an incident side lens array 42 located at the incident side of the light beams emitted from the light source device 2, and an exit side lens array 43 located at the light exit side of the incident side lens array 42.

The incident side lens array 42 has a plurality of small lenses 421 arranged in a matrix in a plane perpendicular to a central axis of a light flux entering the incident side lens array 42 from the light source device 2 as a plurality of third lenses. In other words, the incident side lens array 42 has a plurality of small lenses 421 arranged in a matrix in a plane perpendicular to the illumination light axis Ax parallel to the +Z direction. The incident side lens array 42 divides each of the colored light beams entering the incident side lens array 42 from the light source device 2 into a plurality of partial light beams with the small lenses 421. The plurality of partial light beams divided by the incident side lens array 42 corresponds to a plurality of second partial light beams.

FIG. 6 is a schematic diagram of the incident side lens array 42 viewed from the −Z direction as the light incident side. In other words, FIG. 6 is a schematic diagram showing incident positions of the respective colored light beams emitted from the light source device 2 in the incident side lens array 42.

The first through fourth colored light beams L1 through L4 each emitted from the light source device 2 enter the incident side lens array 42 as shown in FIG. 6.

The green light beam GLs as the first colored light beam L1 enters an area A1 located at the +X direction side and the +Y direction side in the incident side lens array 42. The red light beam RLs as the second colored light beam L2 enters an area A2 located at the +X direction side and the −Y direction side in the incident side lens array 42. The blue light beam BLs as the third colored light beam L3 enters an area A3 located at the −X direction side and the +Y direction side in the incident side lens array 42. The yellow light beam YLs as the fourth colored light beam L4 enters an area A4 located at the −X direction side and the −Y direction side in the incident side lens array 42.

The colored light beams having entered the areas A1 through A4 are each divided into a plurality of partial light beams by the plurality of small lenses 421 disposed in each of the areas, and then the plurality of partial light beams thus divided enters the exit side lens array 43.

As shown in FIG. 1, the exit side lens array 43 has a plurality of small lenses 431 corresponding to the plurality of small lenses 421 as a plurality of fourth lenses. In other words, the small lenses 421 and the small lenses 431 correspond one-to-one to each other. Therefore, the partial light beam emitted from one of the small lenses 421 enters corresponding one of the small lenses 431. Each of the small lenses 431 makes the partial light beam, which has entered the small lens 431, enter the superimposing lens 44.

It should be noted that the exit side lens array 43 and the first reflecting element 26 are in a conjugate relation. Further, the exit side lens array 43 and the wavelength conversion element 28 are in a conjugate relation. Further, since the first reflecting element 26 and the wavelength conversion element 28 each have the conjugate relation with the incident side multi-lens 215, the shape of each of the small lenses 431 of the exit side lens array 43 when viewed from the light incident side is made similar to the shape of each of the small lenses 2151 of the incident side multi-lens 215 when viewed from the light incident side.

Configuration of Superimposing Lens

The superimposing lens 44 superimposes the plurality of partial light beams entering the superimposing lens 44 from the exit side lens array 43 on the light modulation device 6. In other words, the predetermined position where the superimposing lens 44 superimposes the plurality of partial light beams is the arrangement position of light modulation device 6. The superimposing lens 44 makes the first colored light beam L1, the second colored light beam L2, the third colored light beam L3, and the fourth colored light beam L4 each divided into the plurality of partial light beams enter a plurality of microlenses 621 constituting a microlens array described later of the light modulation device 6 at respective angles different from each other via the field lens 5.

Configuration of Field Lens

The field lens 5 is disposed between the homogenization device 4 and the light modulation device 6 in the +Z direction. The field lens 5 makes the whole of the light flux, which enters the light modulation device 6 from the light source device 2 via the homogenization device 4, telecentric.

Configuration of Light Modulation Device

The light modulation device 6 is for modulating the light beams emitted from the light source device 2 to thereby form an image corresponding to image information, and is provided alone to the projector 1A. Specifically, the light modulation device 6 modulates each of the colored light beams which are emitted from the illumination optical device 10A, and then enter the light modulation device 6 via the field lens 5 to form the image corresponding to the image information.

The light modulation device 6 is provided with the liquid crystal panel 61 and the microlens array 62.

Configuration of Liquid Crystal Panel

Figure 7:
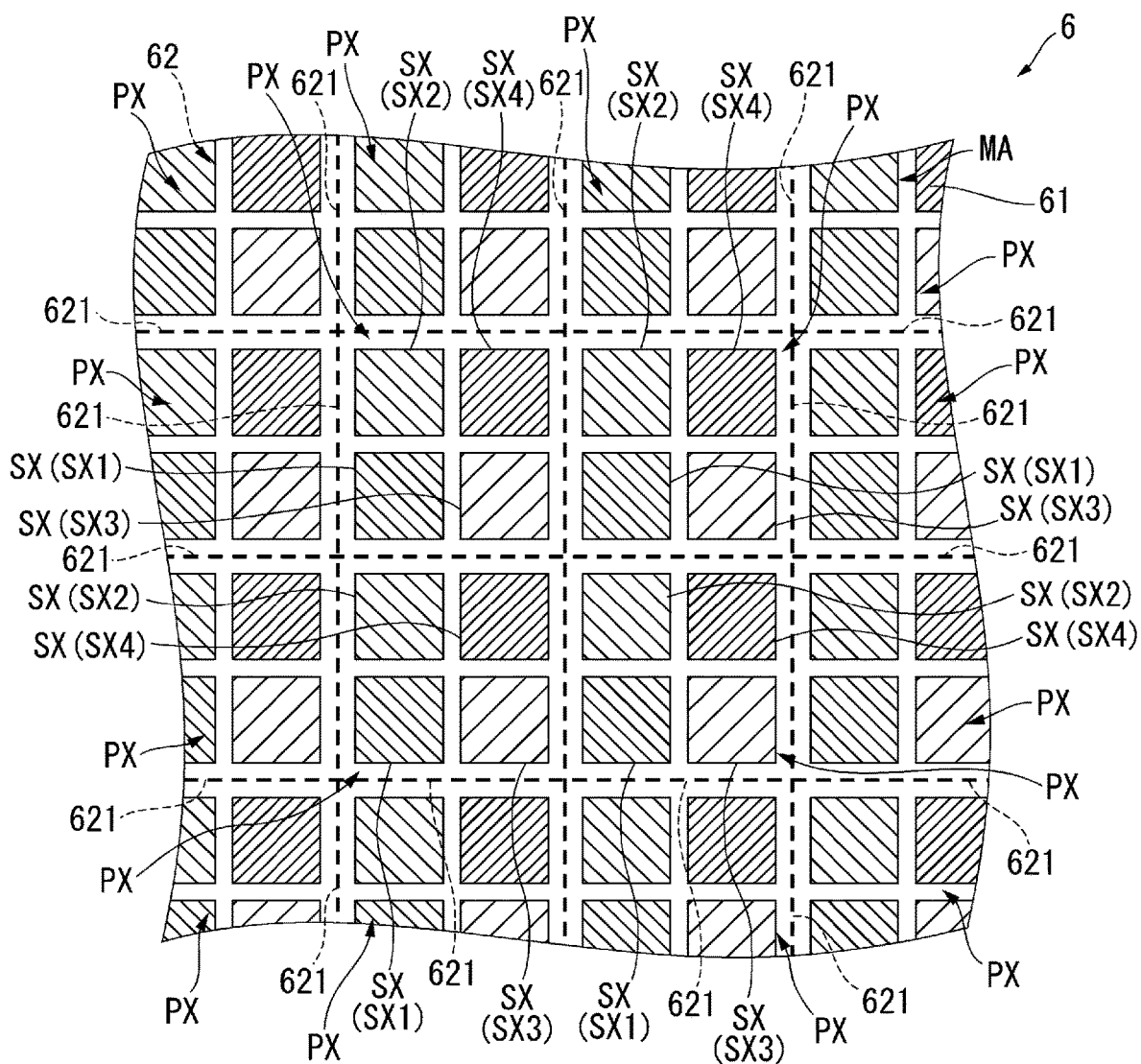
FIG. 7 is a schematic diagram showing in an enlarged manner a part of a light modulation device in the first embodiment.

FIG. 7 is a schematic diagram showing in an enlarged manner a part of the light modulation device 6 viewed from the −Z direction as the light incident side. In other words, FIG. 7 is a schematic diagram showing a correspondence relationship between the pixels PX provided to the liquid crystal panel 61 and the microlenses 621 provided to the microlens array 62.

As shown in FIG. 7, the liquid crystal panel 61 has the plurality of pixels PX arranged in a matrix in an orthogonal plane with respect to the illumination light axis Ax. An area in which the plurality of pixels PX is arranged in the liquid crystal panel 61 is an image formation area for forming the image in the light modulation device 6, and is a modulation area MA for modulating the light entering the light modulation device 6.

Each of the pixels PX has a plurality of sub-pixels SX for respectively modulating corresponding colored light beams. In the present embodiment, each of the pixels PX has four sub-pixels SX1, SX2, SX3, and SX4.

Specifically, in one pixel PX, the first sub-pixel SX1 is disposed at a position on the −X direction side and −Y direction side, and the second sub-pixel SX2 is disposed at a position on the −X direction side and +Y direction side. Further, in one pixel PX, the third sub-pixel SX3 is disposed at a position on the +X direction side and −Y direction side, and the fourth sub-pixel SX4 is disposed at a position on the +X direction side and +Y direction side.

Configuration of Microlens Array

The microlens array 62 is disposed on the light incident side of the liquid crystal panel 61, and guides the colored light beam entering the microlens array 62 to the corresponding sub-pixel SX. The microlens array 62 has a plurality of microlenses 621 which is arranged in a matrix in an orthogonal plane with respect to the illumination light axis Ax, and corresponds to the plurality of pixels PX. Specifically, one microlens 621 is disposed so as to correspond to one pixel PX.

The first colored light beam L1, the second colored light beam L2, the third colored light beam L3, and the fourth colored light beam L4 each divided into the plurality of partial light beams enter each of the microlenses 621 in a superimposed manner due to the homogenization device 4. For this reason, the colored light beams enter each of the microlenses 621 at respective angles different from each other.

Each of the microlenses 621 makes the colored light beams L1 through L4 entering the microlens 621 enter the corresponding sub-pixels SX. Specifically, the microlenses 621 each guide the first colored light beam L1 to the first sub-pixel SX1 out of the sub-pixels SX of the corresponding pixel PX, and each guide the second colored light beam L2 to the second sub-pixel SX2. Further, the microlenses 621 each guide the third colored light beam L3 to the third sub-pixel SX3, and each guide the fourth colored light beam L4 to the fourth sub-pixel SX4.

Thus, the colored light beams L1 through L4 respectively enter the corresponding sub-pixels SX1 through SX4, and the colored light beams L1 through L4 are respectively modulated by the corresponding sub-pixels SX1 through SX4. Such a modulation of the incident colored light beams by the sub-pixels SX1 through SX4 is performed in each of the pixels PX of the liquid crystal panel 61.

Configuration of Projection Optical Device

The projection optical device 7 projects the light modulated by the light modulation device 6. Specifically, the projection optical device 7 projects the image, which is formed by the liquid crystal panel 61 modulating the colored light beams having entered the projection optical device 7, on the projection target surface not shown. As such a projection optical device 7, there can be adopted a combination lens having a mirror tube and at least one lens disposed in the mirror tube.

Shapes of Optical Components in Conjugate Relation

In the projector 1A, the incident side multi-lens 215 and the first reflecting element 26 as an optical element are in a conjugate relation. Specifically, the incident side multi-lens 251 and the plane of incidence of light of the reflecting plate 261 are in the conjugate relation.

Further, the incident side multi-lens 215 and the wavelength conversion element 28 are in a conjugate relation. Specifically, the incident side multi-lens 251 and the plane of incidence of light of the wavelength conversion element 28 are in the conjugate relation.

Further, as described above, the shape of the blue light beam entering the first reflecting element 26 when viewed from the light incident side and the shape of the blue light beam entering the wavelength conversion element 28 when viewed from the light incident side depend on the shape of the small lens 2151 of the incident side multi-lens when viewed from the light incident side. In other words, the shape of the light beam entering the first reflecting element 26 when viewed from the light incident side is similar to the shape of the small lens 2151 when viewed from the light incident side. Further, the shape of the light beam entering the wavelength conversion element 28 when viewed from the light incident side is similar to the shape of the small lens 2151 when viewed from the light incident side.

Meanwhile, the first reflecting element 26 and the exit side lens array 43 are in a conjugate relation. Specifically, the plane of incidence of light in the reflecting plate 261 of the first reflecting element 26 and the exit side lens array 43 are in the conjugate relation. Therefore, by making the shape of the small lens 431 of the exit side lens array 43 when viewed from the light incident side similar to the shape of the blue light beam emitted from the first reflecting element 26 when viewed from the light exit side, it is possible to make the plurality of partial light beams which is emitted from the first reflecting element 26 and then separated from the blue light beam BLs by the incident side lens array 42 efficiently enter the corresponding small lenses 431. In other words, by making the shape of the small lens 2151 of the incident side multi-lens 215 when viewed from the light incident side and the shape of the small lens 431 of the exit side lens array 43 when viewed from the light incident side similar to each other, it is possible to make the partial light beams of the blue light beam BLs, which is emitted from the first reflecting element 26 and then divided by the incident side lens array 42, efficiently enter the corresponding small lenses 431 in the exit side lens array 43.

Similarly, the wavelength conversion element 28 and the exit side lens array 43 are in a conjugate relation. Specifically, the plane of incidence of light of the wavelength conversion element 28 and the exit side lens array 43 are in the conjugate relation. Therefore, by making the shape of the small lens 431 of the exit side lens array 43 when viewed from the light incident side similar to the shape of the yellow light beam emitted from the wavelength conversion element 28 when viewed from the light exit side, it is possible to make the partial light beams of the green light beam GLs, the red light beam RLs, and the yellow light beam YLs which are emitted from the wavelength conversion element 28 and are each divided by the incident side lens array 42 efficiently enter the corresponding small lenses 431. In other words, by making the shape of the small lens 2151 of the incident side multi-lens 215 when viewed from the light incident side and the shape of the small lens 431 of the exit side lens array 43 when viewed from the light incident side similar to each other, it is possible to make the partial light beams of the green light beam GLs, the red light beam RLs, and the yellow light beam YLs which are emitted from the wavelength conversion element 28 and are each divided by the incident side lens array 42 efficiently enter the corresponding small lenses 431 in the exit side lens array 43.

On the other hand, the incident side lens array 42 and the light modulation device 6 are in a conjugate relation. Further, since the plurality of partial light beams divided by the small lenses 421 of the incident side lens array enter the modulation area MA of the light modulation device 6 in a superimposed manner, the shape of each of the small lenses 421 when viewed from the light incident side defines the shape of each of the partial light beams entering the modulation area MA in a superimposed manner.

Therefore, in the present embodiment, by making the shape of each of the small lenses 421 of the incident side lens array 42 when viewed from the light incident side similar to the shape of the modulation area MA of the light modulation device 6 viewed from the light incident side, the light failing to enter the light modulation device 6 out of the light emitted from each of the small lenses 421 is reduced.

Relationship in Configuration Between Incident Side Multi-Lens and Exit Side Multi-Lens As described above, the small lenses 2151 of the incident side multi-lens 215 and the small lenses 2161 of the exit side multi-lens 216 correspond one-to-one to each other, and the partial light beams emitted from the small lenses 2151 enter the corresponding small lenses 2161. Therefore, it is possible to make the shape of each of the small lenses 2151 when viewed from the light incident side similar to the shape of each of the small lenses 2161 when viewed from the light incident side. Specifically, it is possible to make the shape of each of the small lenses 2151 when viewed from the light incident side coincide with the shape of each of the small lenses 2161 when viewed from the light incident side. For this reason, multi-lenses having the same configuration can be adopted as the incident side multi-lens 215 and the exit side multi-lens 216. Therefore, compared to when adopting multi-lenses different in configuration from each other as the incident side multi-lens 215 and the exit side multi-lens 216, it is possible to reduce the manufacturing cost of the light source device 2, and by extension, the illumination optical device 10A and the projector 1A.

Relationship in Configuration Between Incident Side Lens Array and Exit Side Lens Array As described above, the small lenses 421 of the incident side lens array 42 and the small lenses 431 of the exit side lens array 43 correspond one-to-one to each other, and the partial light beams emitted from the small lenses 421 enter the corresponding small lenses 431. Therefore, it is possible to make the shape of each of the small lenses 421 when viewed from the light incident side similar to the shape of each of the small lenses 431 when viewed from the light incident side. Specifically, it is possible to make the shape of each of the small lenses 421 when viewed from the light incident side coincide with the shape of each of the small lenses 431 when viewed from the light incident side. For this reason, lens arrays having the same configuration can be adopted as the incident side lens array 42 and the exit side lens array 43. Therefore, compared to when adopting lens arrays different in configuration from each other as the incident side lens array 42 and the exit side lens array 43, it is possible to reduce the manufacturing cost of the illumination optical device 10A, and by extension, the projector 1A.

Configuration of Polarization Conversion Element

Figure 8:
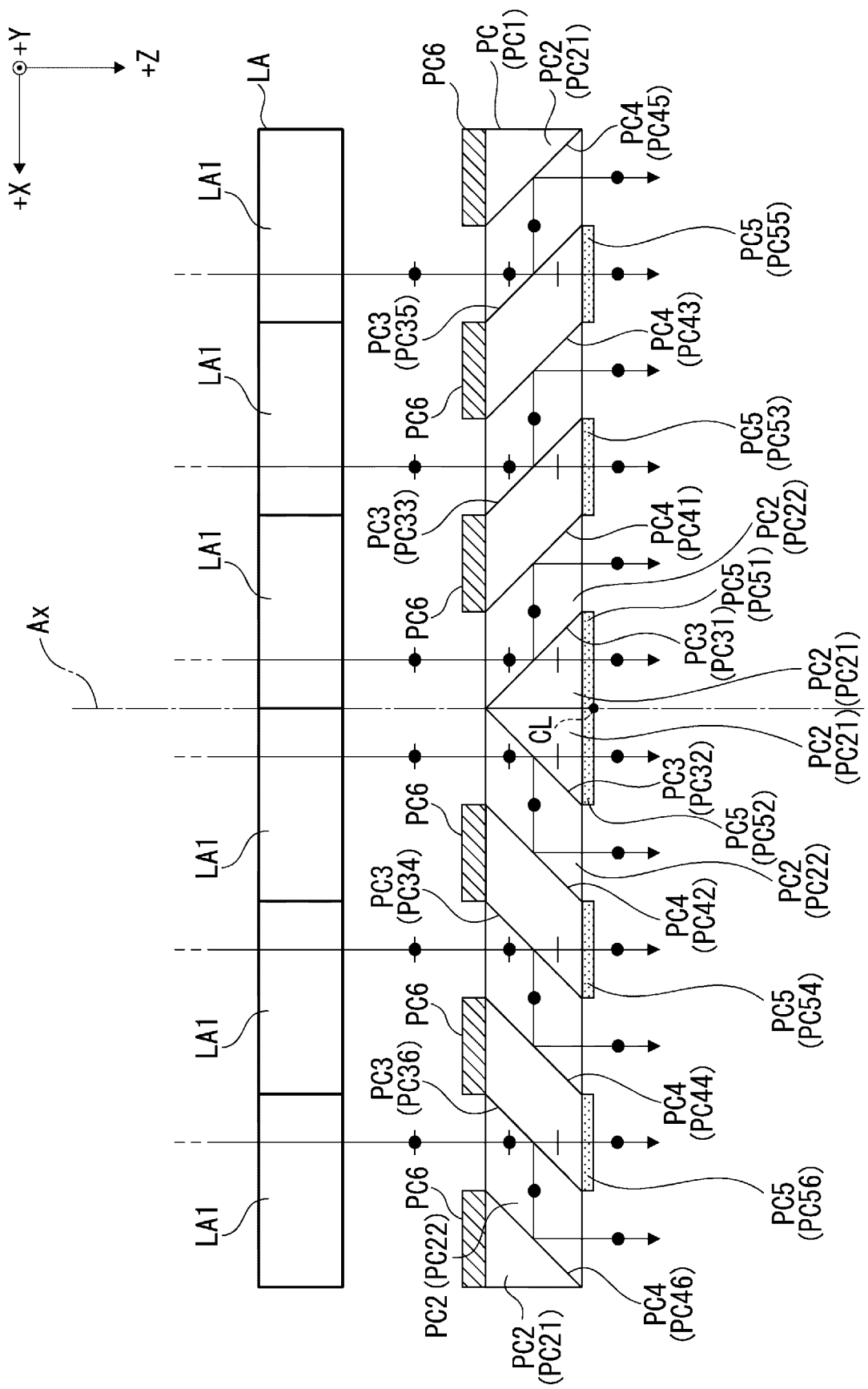
FIG. 8 is a diagram for explaining a configuration of a polarization conversion element.

FIG. 8 is a diagram for explaining an example of a configuration of a polarization conversion element PC. In FIG. 8, out of the light beam passing through the polarization conversion element PC, the light path of the s-polarized light beam is represented by the solid line attached with filled circles, and the light path of the p-polarized light beam is represented by the solid line attached with orthogonal lines.

In the projector in which a liquid crystal panel is adopted as the light modulation device, the polarization conversion element PC shown in FIG. 8 is adopted in some cases.

As shown in FIG. 8, the polarization conversion element PC is disposed on the light exit side of an exit side lens array LA having substantially the same configuration as that of the exit side lens array 43, and uniforms the partial light beams entering the polarization conversion element PC from the exit side lens array LA into single-species linearly polarized light, and then emits the result to the superimposing lens not shown. The polarization conversion element PC has a polarization split element array PC1 for splitting the incident light beam into two types of linearly polarized light to emit the two types of linearly polarized light, a plurality of retardation layers PC5, and a plurality of light blocking sections PC6.

The polarization split element array PC1 has a plurality of base members PC2, a plurality of polarization split layers PC3, and a plurality of reflecting layers PC4. The polarization split element array PC1 is formed line-symmetrically centering on the center line CL along the +Y direction and passing the center in the +X direction. The center line CL crosses the illumination light axis Ax.

The base members PC are each a columnar body formed of a light transmissive material, and are arranged along the +X direction. The plurality of base members PC2 includes base members PC21 each shaped like a isosceles right triangle in the cross-sectional surface along the X-Z plane, and base members PC22 each shaped like a parallelogram in the cross-sectional surface along the X-Z plane, and the polarization split element array PC1 shaped like a plate as a whole is formed by combining the base members PC21, PC22 with each other. Between the base members PC2, there is located the polarization split layer PC3 or the reflecting layer PC4.

As the polarization split layers PC3, there are included polarization split layers PC31 through PC36, and as the reflecting layers PC4, there are included reflecting layers PC41 through PC46. The polarization split layers PC31 through PC36 and the reflecting layers PC41 through PC46 are each formed to have a rectangular shape having a longitudinal direction in the +Y direction.

The three polarization split layers PC31, PC33, and PC35 and the reflecting layers PC41, PC43, and PC45 are disposed alternately from the center line CL toward the −X direction.

The three polarization split layers PC32, PC34, and PC36 and the reflecting layers PC42, PC44, and PC46 are disposed alternately from the center line CL toward the +X direction.

The polarization split layer PC3 and the reflecting layer PC4 are tilted about 45° with respect to the illumination light axis Ax.

The polarization split layer PC3 splits the s-polarized light and the p-polarized light from a polarized light beam including the s-polarized light and the p-polarized light. In the polarization conversion element PC, the polarization split layer PC3 transmits the p-polarized light and reflects the s-polarized light to thereby split the p-polarized light and the s-polarized light from each other.

Each of the reflecting layers PC4 functions together with adjacent one of the polarization split layers PC3 as a pair. Specifically, one of the reflecting layers PC4 corresponds one-to-one to one of the polarization split layers PC3, and is disposed so as to be opposed to the corresponding polarization split layer PC3. The reflecting layers PC4 each reflect the linearly polarized light, which has been reflected by the corresponding polarization split layer PC3, toward the +Z direction as a proceeding direction of the linearly polarized light transmitted through the polarization split layer PC3. In the polarization conversion element PC, the reflecting layers PC4 each reflect the s-polarized light entering the reflecting layer PC4 from the polarization split layer PC3 toward the +Z direction.

As the retardation layers PC5, there are included retardation layers PC51 through PC56. The retardation layers PC51 through PC56 are each a ½ wave plate for rotating the polarization direction of the linearly polarized light beam entering the retardation layer as much as 90°. The retardation layers PC51 through PC56 are each located in the light path of one of the two types of linearly polarized light beams emitted from the polarization split element array PC1.

In the polarization split element PC, the retardation layers PC5 are each disposed in the light path of the p-polarized light transmitted through the polarization split layer PC3 in the light exit surface of the polarization split element array PC1. Specifically, the retardation layers PC56, PC54, PC52, PC51, PC53, and PC55 are disposed at positions respectively overlapping the polarization split layers PC36, PC34, PC32, PC31, PC33, and PC35 when viewing the polarization split element array PC1 from the light exit side. Each of the retardation layers PC5 converts the p-polarized light having been transmitted through the polarization split layer PC3 into the s-polarized light.

As described above, in the light exit surface of the polarization conversion element PC, the light beam as the s-polarized light is emitted from a region where the retardation layer PC5 is disposed, and the light beam as the s-polarized light is emitted from a region where the retardation layer PC5 is not disposed, that is, a region corresponding to the reflecting layer PC4.

The light blocking sections PC6 each block the light beam which does not enter the polarization split layer PC3 but proceeds a direction of directly entering the reflecting layer PC4. The light blocking sections PC6 are disposed so as to correspond to the arrangement positions of the reflecting layers PC4 when viewing the polarization conversion element PC from the light incident side.

When such a polarization conversion element PC is disposed, the exit side lens array LA is designed so that the partial light beams emitted from a plurality of small lenses LA1 provided to the exit side lens array LA enter the corresponding polarization split layers PC3 in the polarization conversion element PC.

For example, when the small lenses LA1 respectively emits the partial light beams in parallel to each other along the +Z direction, the small lenses LA1 are each disposed at the position opposed to the polarization split layer PC3 and the reflecting layer PC4 functioning as a pair. In other words, the dimension of the small lens LA1 in the +X direction as an arrangement direction of the polarization split layer PC3 and the reflecting layer PC4 is set so as to substantially coincide with the dimension of the pair of the polarization split layer PC3 and the reflecting layer PC4 in the +X direction. Further, each of the small lenses LA1 is disposed so as to be opposed to the corresponding pair of the polarization split layer PC3 and the reflecting layer PC4.

Since the polarization conversion element PC is provided with the light blocking sections PC6 corresponding to the reflecting layers PC4, the dimension in the +X direction of the partial light beam which is emitted from the small lens LA1 and then enters the polarization split layer PC3 becomes no larger than the dimension in the +X direction of the polarization split layer PC3. For example, the shape of the partial light beam which is emitted from the small lens LA1 and then enters the polarization split layer PC3 is set as a square shape. Therefore, the partial light beam entering the polarization split layer PC3 from the small lens LA1 becomes a part of the partial light beam having entered the small lens LA1, and thus, the use efficiency of the light is low.

Further, in the surface on the light exit side in the small lens LA1, since the area emitting the partial light beam is small, the secondary light source image formed in the exit side lens array LA is small. Therefore, it becomes easy for a speckle noise to occur in the projection image. In other words, the larger the secondary light source image formed in the exit side lens array LA is, the more difficult it becomes for the speckle noise to occur in the projection image.

It should be noted that when the light beam high in light density enters the wavelength conversion element 28, light saturation occurs, and the wavelength conversion efficiency of converting the wavelength of the incident light decreases in the wavelength conversion element 28.

Further, when the light beam high in light density enters the reflecting plate 261 of the first reflecting element 26, there are promoted the deterioration of the reflecting plate 261, and by extension, the deterioration of the first reflecting element 26.

Figure 9:
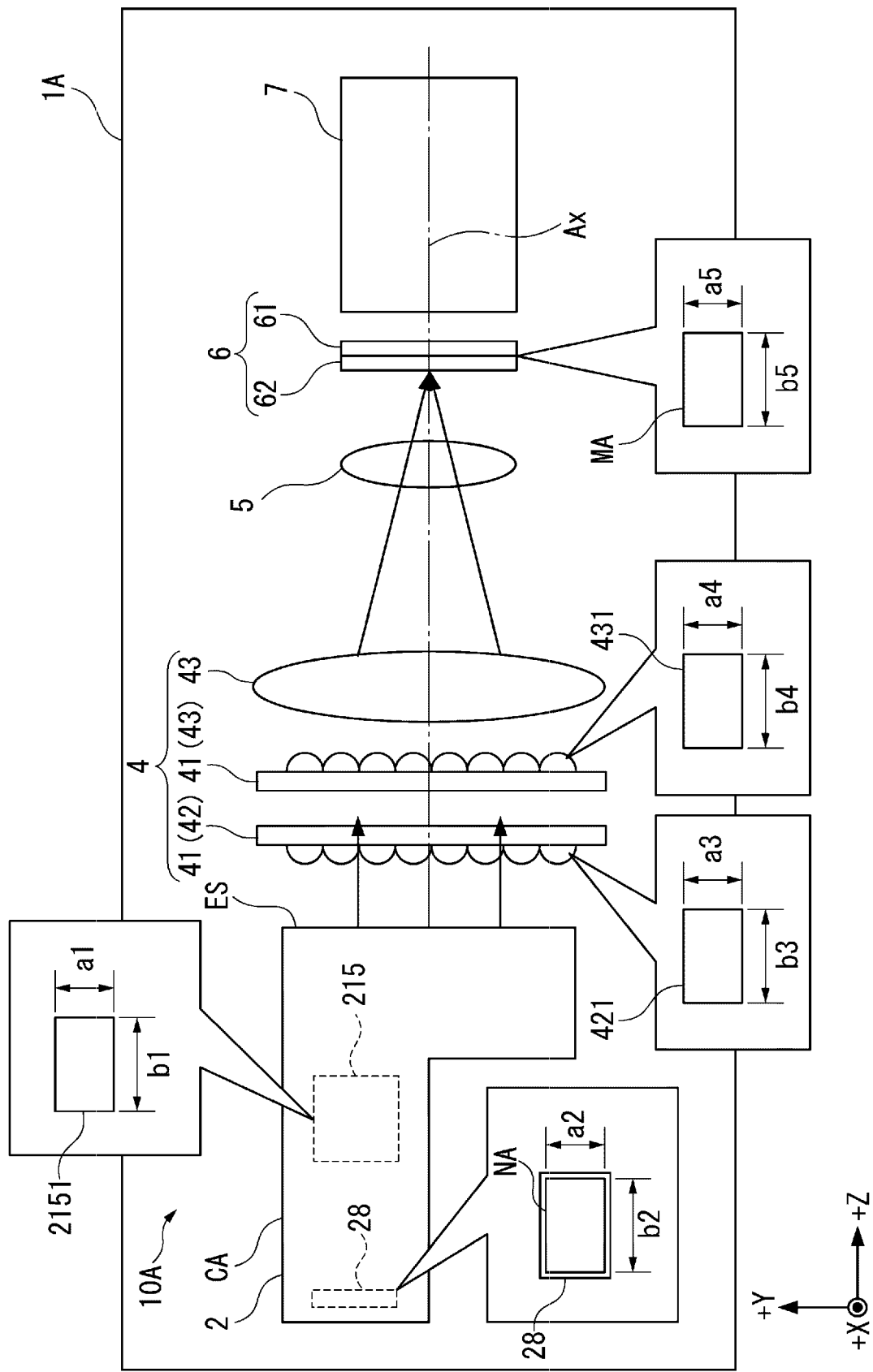
FIG. 9 is a diagram for explaining a relationship between a shape of each of small lenses, a shape of a light beam entering a first reflecting element and a wavelength conversion element, and a shape of a modulation area in the first embodiment.

FIG. 9 is a diagram for explaining a relationship between the shape of the small lens 2151 of the incident side multi-lens 215, the shape of the light beam entering the wavelength conversion element 28, the shapes of the small lenses 421, 431 of the incident side lens array 42 and the exit side lens array 43, and the shape of the modulation area MA.

In contrast, in the present embodiment, since the colored light beams L1 through L4 which are linearly polarized light beams polarized in the same polarization direction, and are spatially separated from each other are emitted from the light source device 2, there is no need to provide the projector 1A with the polarization conversion element PC described above for uniforming the polarization directions of the light beams entering the light modulation device 6.

For this reason, in the projector 1A, as shown in FIG. 9, the shape of the small lens 2151 when viewing the incident side multi-lens 215 having the conjugate relation with the first reflecting element 26 and the wavelength conversion element 28 from the light incident side, and the shape of the small lens 431 when viewing the exit side lens array 43 having the conjugate relation with the first reflecting element 26 and the wavelength conversion element 28 from the light incident side are made similar to each other. In other words, defining the vertical dimension and the horizontal dimension of the small lens 2151 as a1 and b1, and the vertical dimension and the horizontal dimension of the small lens 431 as a4 and b4, the ratio between a1 and b1 and the ratio between a4 and b4 coincide with each other. It should be noted that the horizontal dimension in the small lens 2151 is longer than the vertical dimension in the small lens 2151. In other words, the small lens 2151 has a landscape rectangular shape viewed from the light incident side.

Further, the ratio between a2 and b2 when defining the vertical dimension and the horizontal dimension of the light beam NA entering the wavelength conversion element 28 viewed from the light incident side as a2 and b2 also coincides with the ratio between a1 and b1 and the ratio between a4 and b4. Further, although not shown in the drawings, the ratio between the vertical dimension and the horizontal dimension of the light beam entering the first reflecting element 26 viewed from the light incident side coincides with those in the small lens 2151 and the small lens 431.

Thus, it is possible to reduce the light fails to enter the small lenses 431 of the exit side lens array 43 out of the light beams emitted from the first reflecting element 26 and the wavelength conversion element 28. Therefore, it is possible to make the light beams emitted from the first reflecting element 26 and the wavelength conversion element 28, namely the light beams emitted from the light sources 211, efficiently enter the light modulation device 6, and thus, it is possible to increase the use efficiency of the light beams emitted from the light sources 211.

Further, since it is possible to enlarge the secondary light source image formed on the small lenses 431 of the exit side lens array 43, it is possible to prevent the speckle noise from occurring in the projection image.

Further, since the shape of the small lens 2151 of the incident side multi-lens 215 when viewed from the light incident side becomes the shape described above, the partial light beams each having the similar shape to the shape of the small lens 431 when viewed from the light incident side enter the first reflecting element 26 in a superimposed manner. According to the above, the light density of the light beam entering the first reflecting element 26 can be reduced compared to when the partial light beams each having a square shape smaller than the partial light beams each having the rectangular shape enter the first reflecting element 26. Therefore, the deterioration of the first reflecting element 26 can be suppressed.

Similarly, since the shape of the small lens 2151 of the incident side multi-lens 215 when viewed from the light incident side becomes the shape described above, the partial light beams each having the similar shape to the shape of the small lens 431 when viewed from the light incident side enter the wavelength conversion element 28 in a superimposed manner. In other words, the partial light beams each shaped like a rectangle having an aspect ratio corresponding to the image formation area of the light modulation device 6 enter the wavelength conversion element 28 in a superimposed manner. According to the above, the light density of the light beam entering the wavelength conversion element 28 can be reduced compared to when the partial light beams each having a square shape smaller than the partial light beams each having the rectangular shape enter the wavelength conversion element 28. Therefore, it is possible to prevent the wavelength conversion efficiency in the wavelength conversion element 28 from decreasing, and it is possible to emit the light beams higher in luminance from the light source device 2, and by extension, from the illumination optical device 10A. Further, thus, it is possible to increase the luminance of the image to be projected by the projector 1A.

Further, when defining the vertical dimension and the horizontal dimension of each of the small lenses 421 of the incident side lens array 42 when viewed from the light incident side as a3 and b3, and the vertical dimension and the horizontal dimension of the modulation area of the light modulation device 6 when viewed from the light incident side as a5 and b5, the ratio between a3 and b3 and the ratio between a5 and b5 coincide with each other. Further, in the present embodiment, the aspect ratio of each of the small lenses 2151 of the incident side multi-lens 215, the aspect ratio of each of the small lenses of the exit side multi-lens 216, the aspect ratio of each of the small lenses 421 of the incident side lens array 42, the aspect ratio of each of the small lenses 431 of the exit side lens array 43, and the aspect ratio of the modulation area MA when viewed from the light incident side are the same as each other. In other words, the shape of each of the small lenses 2151 of the incident side multi-lens 215, the shape of each of the small lenses of the exit side multi-lens 216, the shape of each of the small lenses 421 of the incident side lens array 42, the shape of each of the small lenses 431 of the exit side lens array 43, and the shape of the modulation area MA when viewed from the light incident side are similar to each other.

Thus, the pair of multi-lenses 214 and the pair of lens arrays 41 are made easy to form.

Advantages of First Embodiment

According to the projector 1A related to the present embodiment described hereinabove, the following advantages can be exerted.

The projector 1A is provided with the illumination optical device 10A. The illumination optical device 10A is provided with the light source device 2, and the homogenization device 4 for substantially homogenously illuminating the image formation area of the light modulation device 6 as the illumination target area with the light beams emitted from the light source device 2.

The light source device 2 is provided with the light sources 211, the pair of multi-lenses 214, and the first reflecting element 26 and the wavelength conversion element 28 as the optical elements for emitting the diffused light beams based on the plurality of partial light beams entering the optical elements. The pair of multi-lenses 214 divide the light beams emitted from the light sources 211 into a plurality of partial light beams (first partial light beams). The first reflecting element 26 diffusely reflects the plurality of partial light beams entering the first reflecting element 26 in a superimposed manner to emit the diffused light beam as the blue light beam BLs. The wavelength conversion element 28 emits the converted light described above based on the plurality of partial light beams entering the wavelength conversion element 28 in a superimposed manner as the diffused light beam.

The pair of multi-lenses 214 are provided with the incident side multi-lens 215 which is located at the light incident side, and has the plurality of small lenses 2151 as the plurality of first lenses, and the exit side multi-lens 216 which is located at the light exit side, and has the plurality of small lenses 2161 as the plurality of second lenses.

The homogenization device 4 is provided with the pair of lens arrays 41 and the superimposing lens 44. The pair of lens arrays 41 divide the diffused light beams emitted from the first reflecting element 26 and the wavelength conversion element 28 into the plurality of partial light beams (the second partial light beams). The pair of lens arrays 41 are provided with the incident side lens array 42 which is located at the light incident side, and has the plurality of small lenses 421 as the plurality of third lenses, and the exit side lens array 43 which is located at the light exit side, and has the plurality of small lenses 431 as the plurality of fourth lenses. The superimposing lens 44 superimposes the plurality of partial light beams entering the superimposing lens 44 from the pair of lens arrays 41 on the modulation area MA described above as the illumination target area.

The incident side multi-lens 215 and the first reflecting element 26 and the wavelength conversion element 28 as the optical elements are in the conjugate relation. Further, the first reflecting element 26 and the wavelength conversion element 28 as the optical elements and the exit side lens array 43 are in the conjugate relation.

The shape of each of the small lenses 2151 as the plurality of first lenses and the shape of each of the small lenses 431 as the plurality of fourth lenses are in a similarity relationship.

According to such a configuration, it is possible to make the partial light beams entering the small lenses 431 of the exit side lens array 43 become the partial light beams each having the shape corresponding to the shape of the small lens 431. Thus, it is possible to reduce the amount of the light failing to enter the small lenses 431 of the exit side lens array 43. Therefore, it is possible to reduce the light intensity of the light beam failing to enter the light modulation device 6 out of the light beams emitted from the light sources 211, and it is possible to increase the use efficiency of the light beams emitted from the light sources 211.

Further, since it is possible to enlarge the secondary light source image formed in the exit side lens array 43, it is possible to prevent the speckle noise from occurring in the projection image.

Further, the exit side lens array 43, and the first reflecting element 26 and the wavelength conversion element 28 are in the conjugate relation, and the first reflecting element 26 and the wavelength conversion element 28 each have the conjugate relation with the incident side multi-lens 215. Further, the shape of each of the small lenses 2151 when viewed from the light incident side and the shape of each of the small lenses 431 when viewed from the light incident side are similar to each other. According to the above, it is possible to enlarge the beam diameters of the light beam entering the first reflecting element 26 and the light beam entering the wavelength conversion element 28 compared to when the illumination optical device 10A is provided with the polarization conversion element PC, and the light beam having a substantially square shape enters the first reflecting element 26 and the wavelength conversion element 28 in order to make the partial light beams each having the substantially square shape enter the small lenses of the exit side lens array. Therefore, it is possible to decrease the light density of the light beam entering the first reflecting element 26, and thus the deterioration of the first reflecting element 26 can be suppressed. Further, since it is possible to decrease the light density of the light beam entering the wavelength conversion element 28, it is possible to prevent the light saturation from occurring, and thus the decrease of the wavelength conversion efficiency of the wavelength conversion element 28 can be suppressed. Thus, it is possible to increase the use efficiency of the light beams emitted from the light sources 211, and thus, it is possible to increase the amount of the light beam emitted from the illumination optical device 10A.

It should be noted that the light source device 2 emits light beams as a single-species linearly polarized light. Therefore, since there is no need to dispose the polarization conversion element PC described above, it is possible to prevent an increase in the number of components of the light source device 2, and by extension, an increase in the number of components of the illumination optical device 10A. Besides the above, it is possible to promote the reduction in size of the light source device 2, and by extension, the reduction in size of the illumination optical device 10A.

The illumination optical device 10A is provided with the first reflecting element 26 having the reflecting plate 261 as an optical element. The first reflecting element 26 is the diffuser element for emitting the diffused light obtained by diffusing the incident light.

According to such a configuration, a part of the source light bean having been emitted from the light source 211 as the semiconductor laser is diffused by the first reflecting element 26 as the diffuser element and is then emitted. According to the above, by passing the first reflecting element 26, it is possible to convert the blue light beam as the discrete light beam emitted from the light source 211 into the blue light beam as a continuous light beam. Therefore, it is possible to increase the superimposing performance by the superimposing lens 44 which the blue light beam enters via the pair of lens arrays 41.

The illumination optical device 10A is provided with the wavelength conversion element 28 including the phosphor material as an optical element. The wavelength conversion element 28 diffuses the converted light having the wavelength longer than the wavelength of the incident light and then emits the result as the diffused light.

According to such a configuration, since the yellow light beam YLn as the continuous light beam can be emitted from the wavelength conversion element 28, it is possible to make the green light beam GLs, the red light beam RLs, and the yellow light beam YLs as the continuous light beams enter the superimposing lens 44. Therefore, it is possible to increase the superimposing performance by the superimposing lens 44.

The light source device 2 has the first polarization split element 22, the second polarization split element 23, the first retardation element 24, the first reflecting element 26, the wavelength conversion element 28, the second retardation element 29, the first color separation element 30, the second color separation element 31, and the third retardation element 32.

The first polarization split element 22 transmits the blue light beam BLp as the first polarization component toward the +X direction as the first direction, and reflects the blue light beam BLs as the second polarization component toward the −Z direction as the second direction out of the source light beam which is emitted from the light source 211 and then enters the first polarization split element 22 along the +X direction via the pair of multi-lenses 214. The second polarization split element 23 is located at the +X direction side of the first polarization split element 22, and reflects the blue light beam BLp, which enters the second polarization split element 23 in the +X direction, toward the −Z direction. The first reflecting element 26 is located at the −Z direction side of the first polarization split element 22, and reflects the source light beam entering the first reflecting element 26 toward the +Z direction. The first retardation element 24 is located between the first polarization split element 22 and the first reflecting element 26 in the +Z direction, and converts the polarization component of the source light beam entering the first retardation element 24. The wavelength conversion element 28 is located at the −Z direction side of the second polarization split element 23, and emits the yellow light beam YLn, which is the unpolarized converted light beam obtained by performing the wavelength conversion on the blue light beam BLp entering the wavelength conversion element 28 in the −Z direction, toward the +Z direction. The second retardation element 29 is the ½ wave plate which is located at the +Z direction side of the second polarization split element 23, and which the yellow light beam YLp having been transmitted through the second polarization split element 23 enters. The first color separation element 30 is located at the +Z direction side of the second retardation element 29, and separates the yellow light beam YLs entering the first color separation element 30 from the second retardation element 29 into the first colored light beam L1 and the second colored light beam L2. The second color separation element 31 is located at the +Z direction side of the first polarization split element 22, and separates the light beam entering the second color separation element 31 in the +Z direction from the first polarization split element 22 into the third colored light beam L3 and the fourth colored light beam L4. The third retardation element 32 is the ½ wave plate located in the light path of the third colored light beam L3 separated by the second color separation element 31.

The second polarization split element 23 transmits the yellow light beam YLp as the light beam of the first polarization component in the +Z direction to make the yellow light beam YLp enter the second retardation element 29, and reflects the yellow light beam YLs as the light beam of the second polarization component toward the −X direction out of the yellow light beam YLn entering the second polarization split element 23 in the +Z direction.

The first polarization split element 22 transmits the blue light beam BLp, which is the first polarization component of the source light beam entering the first polarization split element 22 in the +Z direction, toward the +Z direction to make the blue light beam BLp enter the second color separation element 31, and reflects the yellow light beam YLs as the second polarization component of the converted light beam entering the first polarization split element 22 in the −X direction toward the +Z direction to make the yellow light beam YLs enter the second color separation element 31.

The first color separation element 30 emits the green light beam GLs which is the first color component included in the yellow light beam YLs entering the first color separation element 30 from the second retardation element 29 as the first colored light beam L1, and emits the red light beam RLs as the second color component included in the yellow light beam YLs as the second colored light beam L2.

The second color separation element 31 emits the blue light beam BLp entering the second color separation element 31 from the first polarization split element 22 to the third retardation element 32 as the third colored light beam L3, and emits the yellow light beam YLs entering the second color separation element 31 from the first polarization split element 22 as the fourth colored light beam L4.

Further, the first reflecting element 26 and the wavelength conversion element 28 are the optical element described above.

According to such a configuration, it is possible to uniform the green light beam as the first colored light beam L1, the red light beam as the second colored light beam L2, the blue light beam as the third colored light beam L3, and the yellow light beam or the green light beam as the fourth colored light beam emitted from the light source device 2 to the linearly polarized light beams polarized in the same polarization direction. Therefore, there is no need to provide the illumination optical device 10A with the polarization conversion element PC described above, and it is possible to configure the illumination optical device 10A which exerts the advantages described above.

Here, when the size of the wavelength conversion element 28 when viewed from the light incident side is larger than the beam diameter of the light beam entering the wavelength conversion element 28, the exit area of the converted light expands outside the incident area of the light beam in the wavelength conversion element 28. Therefore, there is a possibility that the light intensity of the converted light which has been emitted from the wavelength conversion element 28 and then enters the second light collection element 27 is reduced.

In contrast, in the illumination optical device 10A, the shape of the wavelength conversion element 28 when viewed from the light incident side is similar to the shape of the light beam entering the wavelength conversion element 28 when viewed from the light incident side. Further, the size of the wavelength conversion element 28 when viewed from the light incident side substantially coincides with the beam diameter of the light beam entering the wavelength conversion element 28 when viewed from the light incident side.

According to such a configuration, it is possible to prevent the exit area of the yellow light beam YLn in the wavelength conversion element 28 from expanding outside. Thus, it is possible to suppress the expansion of the yellow light beam YLn emitted from the wavelength conversion element 28, and thus, it is possible to prevent the light intensity of the yellow light beam YLn entering the second light collection element 27 from decreasing. Therefore, since it is possible to prevent the amount of light entering the light modulation device 6 from decreasing, it is possible to increase the use efficiency of the light beams emitted from the light sources 211.

The shape of each of the small lenses 2151 as the plurality of first lenses and the shape of each of the small lenses 2161 as the plurality of second lenses are in a similarity relationship. Further, the shape of each of the small lenses 421 as the plurality of third lenses and the shape of each of the small lenses 431 as the plurality of fourth lenses are in a similarity relationship.

According to such a configuration, it is possible to make it easy to design the incident side multi-lens 215 having the plurality of small lenses 2151 and the exit side multi-lens 216 having the plurality of small lenses 2161. Similarly, it is possible to make it easy to design the incident side lens array 42 having the plurality of small lenses 421 and the exit side lens array 43 having the plurality of small lenses 431. Therefore, it is possible to reduce the manufacturing cost of the pair of multi-lenses 214 and the pair of lens arrays 41, and by extension, it is possible to reduce the manufacturing cost of the illumination optical device 10A.

The incident side multi-lens 215 and the exit side multi-lens 216 are multi-lenses having the same configuration. The incident side lens array 42 and the exit side lens array 43 are lens arrays having the same configuration.

According to the above, it is possible to reduce the manufacturing cost of the pair of multi-lenses 214, and in addition, it is possible to reduce the manufacturing cost of the pair of lens arrays 41. Therefore, it is possible to reduce the manufacturing cost of the illumination optical device 10A, and by extension, the manufacturing cost of the projector 1A.

The projector 1 is provided with the light modulation device 6 having the modulation area for modulating the light beams emitted from the illumination optical device 10A, and the projection optical device 7 for projecting the light modulated by the light modulation device 6 in addition to the illumination optical device 10A. The modulation area MA of the light modulation device 6 is the illumination target area to be illuminated by the illumination optical device 10A.

According to such a configuration, substantially the same advantages as those of the illumination optical device 10A can be obtained. Further, since the modulation area MA is substantially homogenously illuminated by the illumination optical device 10A, it is possible to prevent the luminance variation and the color variation from occurring in the image to be formed by the light modulation device 6 and then projected by the projection optical device 7. Further, since it is possible to increase the amount of the light beam entering the modulation area MA, it is possible to increase the luminance of the image to be projected.

The shape of the modulation area MA is similar to the shape of each of the small lenses 2151 as the plurality of first lenses.

According to such a configuration, it is possible to make the light beam emitted from the incident side multi-lens 215 efficiently enter the modulation area MA. In other words, it is possible to reduce the amount of the light beam which fails to enter the modulation area MA. Therefore, it is possible increase the use efficiency of the light beams emitted from the light sources 211.

Modifications of First Embodiment

In the projector 1A, it is assumed that the light source device 2 emits the green light beam as the first colored light beam L1, emits the red light beam as the second colored light beam, emits the blue light beam as the third colored light beam, and emits the yellow light beam or the green light beam as the fourth colored light beam. In other words, it is assumed that the light source device 2 emits the first colored light beam L1 as the green light beam GLs from the first exit position S1, and emits the second colored light beam L2 as the red light beam RLs from the second exit position S2 located at the −Y direction side of the first exit position S1. Further, it is assumed that the light source device 2 emits the third colored light beam L3 as the blue light BLs from the third exit position S3 located at the −X direction side of the first exit position S1, and emits the fourth colored light beam L4 as the yellow light beam YLs or the green light beam GLs from the fourth exit position S4 located at the −Y direction side of the third exit position S3.

However, this is not a limitation, but, for example, the first colored light beam L1 to be emitted from the first exit position S1 can be the red light beam RLs, and the second colored light beam L2 to be emitted from the second exit position S2 can be the green light beam GLs. In this case, it is sufficient to make the color separation layer 3011 provided to the first color separation element 30 have the property of transmitting the red light component toward the +Z direction and reflecting the green light component toward the −Y direction out of the incident light.

Further, for example, the third colored light beam L3 to be emitted from the third exit position S3 can be the yellow light beam YLs or the green light beam GLs, and the fourth colored light beam L4 to be emitted from the fourth exit position S4 can be the blue light BLs. In this case, it is sufficient to make the color separation layer 3111 provided to the second color separation element 31 have the property of reflecting the blue light beam toward the −Y direction and transmitting the yellow light beam toward the +Z direction out of the incident light, or the property of reflecting the blue light beam as the p-polarized light and transmitting the yellow light beam as the s-polarized light. On this occasion, it is sufficient to dispose the third retardation element 32 in the light path of the blue light beam, and dispose the second reflecting element 33 or the third color separation element in the light path of the yellow light beam.

According to such a projector as described above, it is possible to exert substantially the same advantages as those of the projector 1A.

Second Embodiment

Then, a second embodiment of the present disclosure will be described.

A projector according to the present embodiment has substantially the same features as those of the projector 1A according to the first embodiment, but is different in the configuration of the light source device. It should be noted that in the following description, a part which is the same or substantially the same as the part having already been described is denoted by the same reference symbol, and the description thereof will be omitted.

Schematic Configuration of Projector

Figure 10:
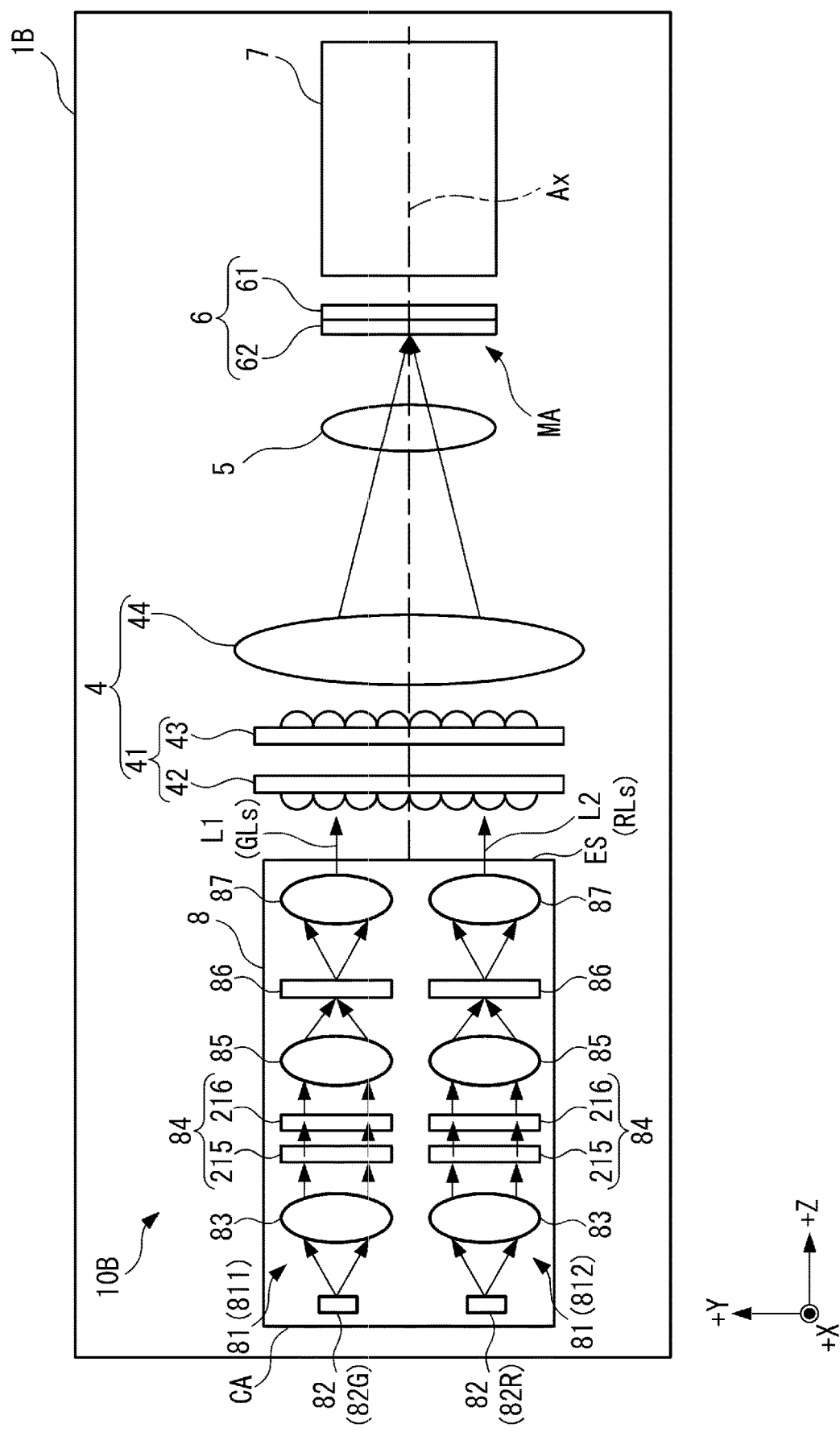
FIG. 10 is a schematic diagram of a projector in a second embodiment viewed from the +X direction.
Figure 11:
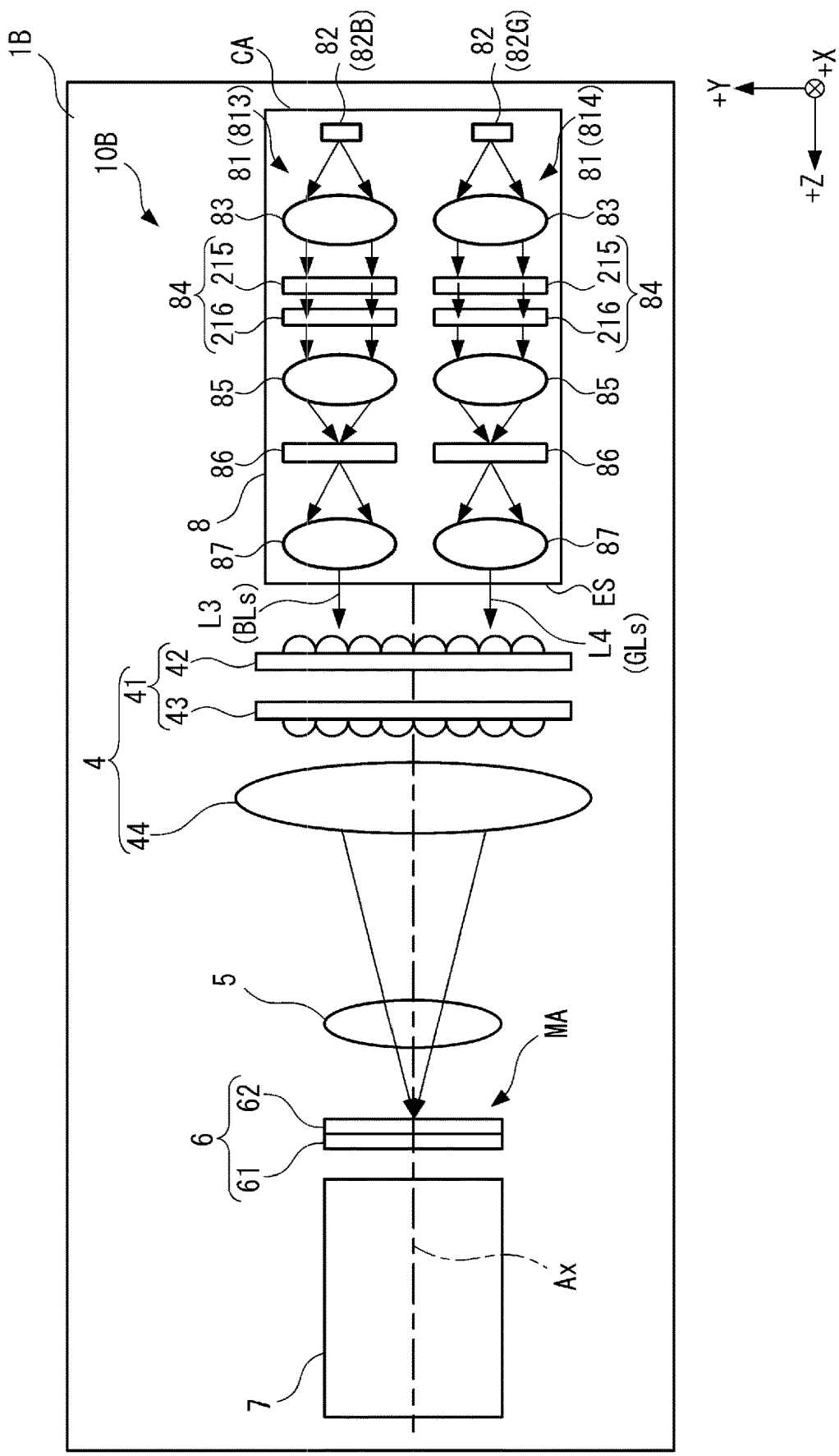
FIG. 11 is a schematic diagram of the projector in the second embodiment viewed from the −X direction.

FIG. 10 and FIG. 11 are each a schematic diagram showing a configuration of a projector 1B according to the present embodiment. Specifically, FIG. 10 is a schematic diagram of the configuration of the projector 1B viewed from the +X direction, and FIG. 11 is a schematic diagram of the configuration of the projector 1B viewed from the −X direction.

As shown in FIG. 10 and FIG. 11, the projector 1B according to the present embodiment has substantially the same configuration and functions as those of the projector 1A except the point that an illumination optical device 10B is provided instead of the illumination optical device 10A. In other words, the projector 1B is a so-called single-plate projector. The illumination optical device 10B has substantially the same configuration and functions as those of the illumination optical device 10A except the point that a light source device 8 is provided instead of the light source device 2. In other words, the illumination optical device 10B has a light source device 8 and the homogenization device 4.

Configuration of Light Source Device

Figure 12:
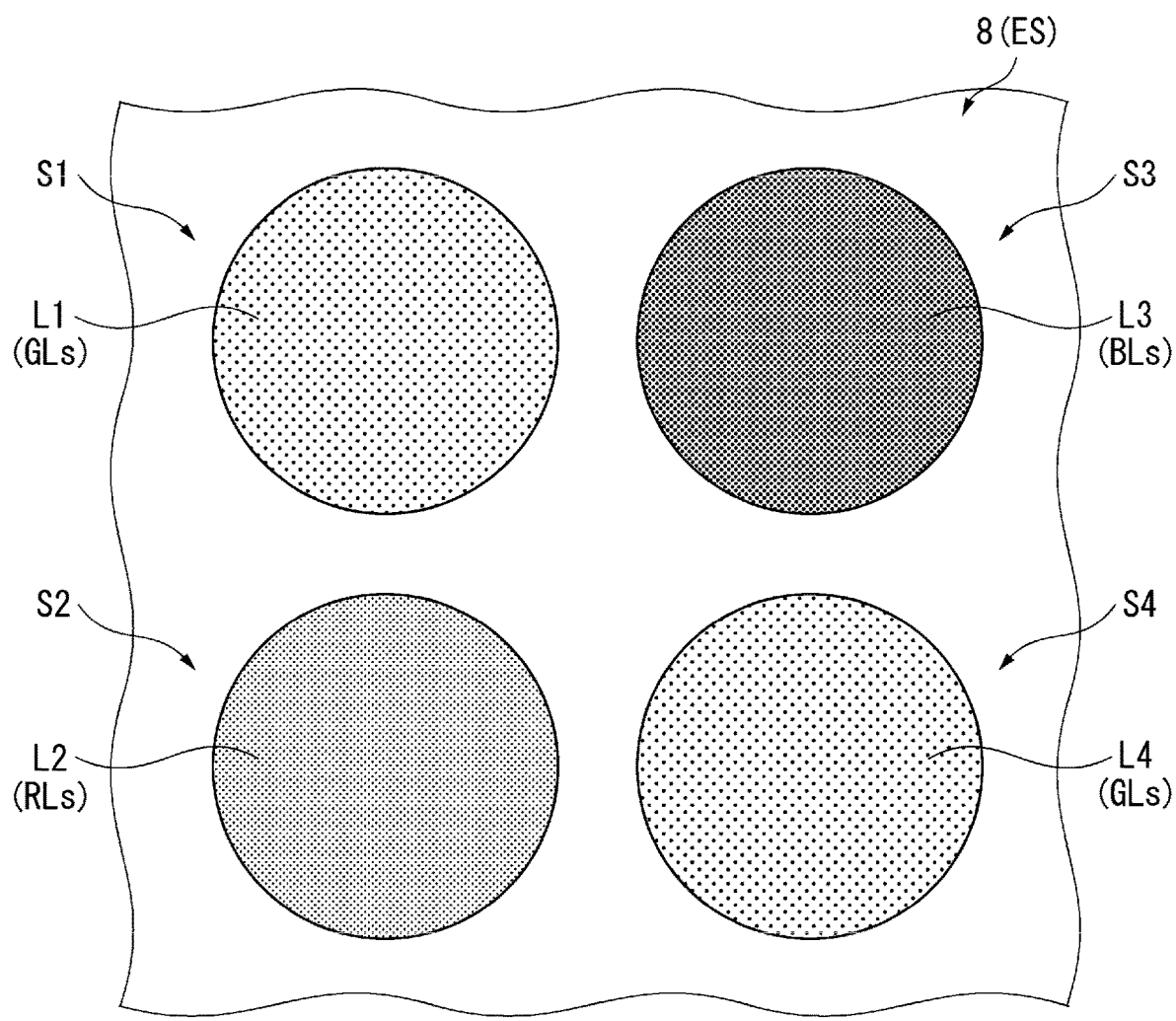
FIG. 12 is a diagram showing exit positions of respective colored light beams emitted from a light source device in the second embodiment.

FIG. 12 is a diagram showing the exit positions S1 through S4 of the plurality of colored light beams L1 through L4 emitted from the light source device 8. In other words, FIG. 12 is a diagram of the exit surface ES of the light source device 8 viewed from the +Z direction.

Similarly to the light source device 2, the light source device 8 emits the plurality of colored light beams L1 through L4, which are linearly polarized light beams polarized in the same polarization direction, and are spatially separated from each other, toward the +Z direction. The light source device 8 is provided with the chassis CA as the light source device chassis, and four light source sections 81 disposed inside the chassis CA. As shown in FIG. 12, the light source device 8 emits the colored light beams L1 through L4 spatially separated from each other from the exit positions S1 through S4 in the exit surface ES of the chassis CA.

The four light source sections 81 include a first light source section 811 located at the +X direction side and the +Y direction side, a second light source section 812 located at the +X direction side and the −Y direction side, a third light source section 813 located at the −X direction side and the +Y direction side, and a fourth light source section 814 located at the −X direction side and the −Y direction side.

As shown in FIG. 10 and FIG. 12, the first light source section 811 emits the green light beam GLs as the first colored light beam L1 from the first exit position S1. The second light source section 812 emits the red light beam RLs as the second colored light beam L2 from the second exit position S2.

As shown in FIG. 11 and FIG. 12, the third light source section 813 emits the blue light beam BLs as the third colored light beam L3 from the third exit position S3. The fourth light source section 814 emits the green light beam GLs as the fourth colored light beam L4 from the fourth exit position S4.

As shown in FIG. 10 and FIG. 11, each of the light source sections 81 has a light source 82, a collimator lens 83, a pair of multi-lenses 84, a light collection element 85, a diffuser element 86, and a collimating element 87.

Out of the light sources 82, a light source 82G provided to the first light source section 811 and the fourth light source section 814 emits the green light beam GLs toward the +Z direction. Out of the light sources 82, a light source 82R provided to the second light source section 812 emits the red light beam RLs toward the +Z direction, and a light source 82B provided to the second light source section 813 emits the blue light beam BLs toward the +Z direction. Each of the light sources 82 is configured including a laser diode (LD) as a semiconductor laser for emitting the corresponding colored light beam. However, at least one of the four light sources 82 can be configured including another solid-state light source such as an LED for emitting the corresponding colored light beam. Further, the light source 82 provided to the fourth light source section 814 can emit the yellow light beam YLs, and the colored light beams emitted by the respective light sources 82 are not limited to the above. Further, the colored light beams emitted by the respective light sources 82 are not required to be the colored light beam as the s-polarized light with respect to the light modulation device 6, but can also be the colored light beam as the p-polarized light with respect to the light modulation device 6.

Similarly to the collimator lens 212, the collimator lens 83 collimates the colored light beam emitted from the corresponding light source 82.

Similarly to the pair of multi-lenses 214, the pair of multi-lenses 84 are constituted by the incident side multi-lens 215 and the exit side multi-lens 216, and divide the light beam entering the incident side multi-lens 215 into a plurality of partial light beams. In the pair of multi-lenses 84, the incident side multi-lens 215 and the diffuser element 86 are in a conjugate relation. The shape of each of the colored light beams entering the diffuser element 86 in a superimposed manner is defined by the shape of the small lens 2151 when viewing the incident side multi-lens 215 from the light incident side.

The light collection element 85 converges the plurality of partial light beams entering the light collection element 85 from the pair of multi-lenses 84 on the diffuser element 86. The light collection element 85 is formed of a single lens in the example shown in FIG. 10 and FIG. 11, but can also be constituted by a plurality of lenses similarly to the first light collection element 25 and the second light collection element 27.

The diffuser element 86 is an optical element for diffusing the colored light beam having entered the diffuser element 86 in the process of transmitting the colored light beam toward the +Z direction. In other words, the diffuser element 86 emits the colored light beam, which enters the diffuser element 86 from the −Z direction, toward the +Z direction in a diffused manner. The diffuser element 86 has the conjugate relation with the incident side the multi-lens 215 of the corresponding pair of multi-lenses 84. The light beam having a similar shape to the shape of the small lens 2151 when viewing the incident side multi-lens 215 from the light incident side enters the diffuser element 86.

Further, each of the diffuser elements 86 has the conjugate relation with the exit side lens array 43, and the shape of the light beam emitted from the diffuser element 86 is similar to the shape of the small lens 431 when viewing the exit side lens array 43 from the light incident side.

It should be noted that the diffuser element 86 can be fixed, or can also be rotated centering on a rotational axis parallel to the +Z direction.

The collimating element 87 collimates the colored light beam diffused in the diffuser element 86, and then emits the result toward the +Z direction. The green light beam GLs collimated by the collimating element 87 of the first light source section 811 is emitted toward the +Z direction from the first exit position S1 as the first colored light beam L1. The red light beam RLs collimated by the collimating element 87 of the second light source section 812 is emitted toward the +Z direction from the second exit position S2 as the second colored light beam L2. The blue light beam BLs collimated by the collimating element 87 of the third light source section 813 is emitted toward the +Z direction from the third exit position S3 as the third colored light beam L3. The green light beam GLs collimated by the collimating element 87 of the fourth light source section 814 is emitted toward the +Z direction from the fourth exit position S4 as the fourth colored light beam L4.

The colored light beams L1 through L4 emitted from the light source device 8 in such a manner enter the incident side lens array 42 constituting the pair of lens arrays 41 in the homogenization device 4.

As described above, the homogenization device 4 has the pair of lens arrays 41 constituted by the incident side lens array 42 and the exit side lens array 43, and the superimposing lens 44.

Out of these constituents, the incident side lens array 42 is in the conjugate relation with the light modulation device 6. The shape of the small lens 421 when viewing the incident side lens array 42 from the light incident side is similar to the shape of the modulation area MA in the light modulation device 6 viewed from the light incident side. Further, the exit side lens array 43 of the homogenization device 4 is in the conjugate relation with each of the diffuser elements 86. The shape of the small lens 431 when viewing the exit side lens array 43 from the light incident side is similar to the shape of the colored light beam entering each of the diffuser elements 86 viewed from the light incident side. In other words, the shape of the small lens 431 when viewed from the light incident side is similar to the shape of the small lens 2151 when viewing the incident side multi-lens 215 from the light incident side.

Further, similarly to the projector 1A, the partial light beam of each of the colored light beams emitted from the exit side lens array 43 enters the light modulation device 6 via the superimposing lens 44 and the field lens 5. The image modulated and then formed by the light modulation device 6 is projected by the projection optical device 7 on the projection target surface to thereby be displayed.

Advantages of Second Embodiment

According to the projector 1B related to the present embodiment described hereinabove, substantially the same advantages as those of the projector 1A can be exerted.

For example, the illumination optical device 10B in the projector 1B is provided with the light source device 8, and the homogenization device 4 for substantially homogenously illuminating the modulation area MA as the illumination target area with the light beams emitted from the light source device 8.

The light source device 8 is provided with the four light source sections 81. Each of the light source sections is provided with the light source 82, the pair of multi-lenses 84, and the diffuser element 86 as the optical element. In the light source section 811, the pair of multi-lenses 84 divide the green light beam GLs emitted from the light source 82G into the plurality of partial light beams (the first partial light beams). The pair of multi-lenses 84 are provided with the incident side multi-lens 215 which is located at the light incident side, and has the plurality of small lenses 2151 as the plurality of first lenses, and the exit side multi-lens 216 which is located at the light exit side, and has the plurality of small lenses 2161 as the plurality of second lenses. The same applies to the pair of multi-lenses 84 in other light source sections 812 through 814. The plurality of partial light beams enters the diffuser element 86 from the corresponding pair of multi-lenses 84 in a superimposed manner, and then the diffuser element 86 emits the diffused light based on the plurality of partial light beams of each of the colored light beams having entered the diffuser element 86. In other words, each of the diffuser elements 86 diffuses and then emits the plurality of partial light beams entering the diffuser element 86 in a superimposed manner.

The homogenization device 4 is provided with the pair of lens arrays 41 for dividing the diffused light beam emitted from the diffuser element 86 into the plurality of partial light beams (the plurality of second partial light beams), and the superimposing lens 44 for superimposing the plurality of partial light beams on the modulation area MA as the illumination target area. The pair of lens arrays 41 are provided with the incident side lens array 42 which is located at the light incident side, and has the plurality of small lenses 421 as the plurality of third lenses, and the exit side lens array 43 which is located at the light exit side, and has the plurality of small lenses 431 as the plurality of fourth lenses.

In each of the light source sections 81, the incident side multi-lens 215 and the diffuser element 86 are in the conjugate relation. The diffuser element 86 provided to each of the light source sections 81 and the exit side lens array 43 are in the conjugate relation.

In each of the light source sections 81, the shape of each of the small lenses 2151 and the shape of each of the small lens 431 are in a similarity relationship.

According to such a configuration, similarly to the case in the illumination optical device 10A, it is possible to make the partial light beams entering the small lenses 431 of the exit side lens array 43 become the partial light beams each having the shape corresponding to the shape of the small lens 431. Thus, it is possible to reduce the amount of the light failing to enter the small lenses 431 of the exit side lens array 43. Therefore, it is possible to reduce the light intensity of the light beam failing to enter the light modulation device 6 out of the light beam emitted from each of the light sources 82, and it is possible to increase the use efficiency of the light beam emitted from each of the light sources 82.

Further, since it is possible to enlarge the secondary light source image formed in the exit side lens array 43, it is possible to prevent the speckle noise from occurring in the projection image.

Further, the exit side lens array 43 and the diffuser element 86 of each of the light source sections 81 are in the conjugate relation, and the diffuser element 86 of each of the light source sections 81 and the incident side multi-lens 215 of each of the light source sections 81 are in the conjugate relation. Further, the shape of each of the small lenses 2151 when viewed from the light incident side and the shape of each of the small lenses 431 when viewed from the light incident side are similar to each other. According to the above, it is possible to enlarge the light beam entering the diffuser element 86 compared to when the illumination optical device 10B is provided with the polarization conversion element PC, and the light beam having a square shape is made to enter each of the small lenses 431 of the exit side lens array 43. Therefore, it is possible to decrease the light density of the light beam entering the diffuser element 86, and thus the deterioration of the diffuser element 86 can be suppressed.

It should be noted that the light source device 8 emits the light beams as a single-species linearly polarized light similarly to the light source device 2. Therefore, since there is no need to dispose the polarization conversion element PC described above, it is possible to prevent an increase in the number of components of the light source device 8, and by extension, an increase in the number of components of the illumination optical device 10B. Besides the above, it is possible to promote the reduction in size of the light source device 8, and by extension, the reduction in size of the illumination optical device 10B.

Third Embodiment

Then, a third embodiment of the present disclosure will be described.

A projector according to the present embodiment has substantially the same features as those of the projectors 1A, 1B according to the first and second embodiments, but is different in the configuration of the light source device. It should be noted that in the following description, a part which is the same or substantially the same as the part having already been described is denoted by the same reference symbol, and the description thereof will be omitted.

Schematic Configuration of Projector

Figure 13:
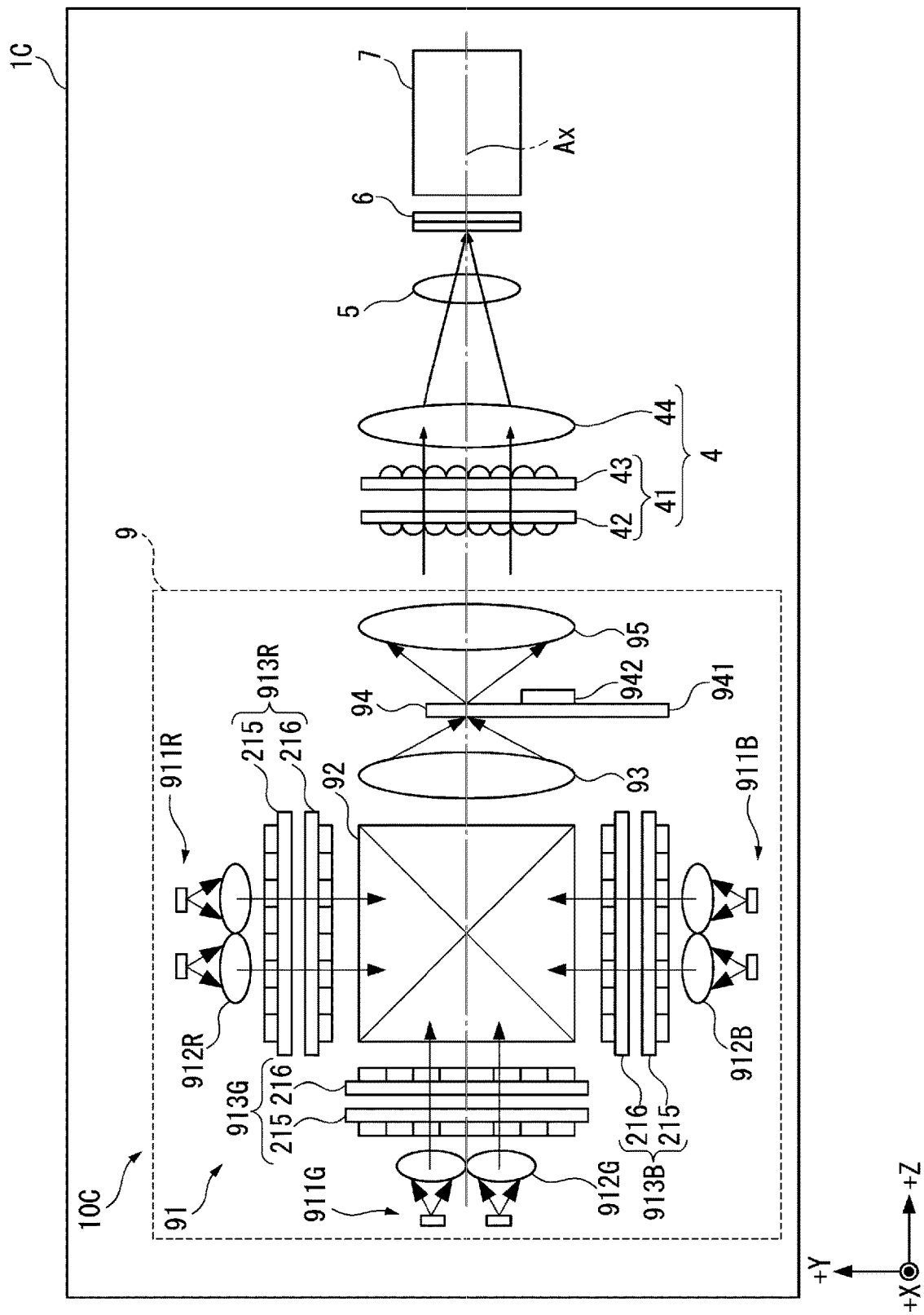
FIG. 13 is a schematic diagram showing a configuration of a projector according to a third embodiment.

FIG. 13 is a schematic diagram showing a configuration of a projector 1C according to the present embodiment.

Similarly to the projectors 1A, 1B, the projector 1C according to the present embodiment is for modulating the light beams emitted from the light source to form the image corresponding to the image information, and then projecting the image thus formed on the projection target surface, and is a so-called single-plate projector.

As shown in FIG. 13, the projector 1C is provided with an illumination optical device 10C having a light source device 9 and the homogenization device 4, the field lens 5, the light modulation device 6, and the projection optical device 7.

Configuration of Light Source Device

The light source device 9 emits the light beam entering the homogenization device 4 toward the +Z direction. Unlike the light source devices 2, 8, the light source device 9 emits a white light beam having the red light beam, the green light beam, and the blue light beam combined with each other. The light source device 9 is provided with a light source section 91, a color combining device 92, a light collection element 93, a diffuser element 94, and a collimating element 95.

Configuration of Light Source Section

The light source section 91 emits the green light beam, the red light beam, and the blue light beam to the color combining device 92. The light source section 91 has three light sources 911B, 911G, and 911R, three collimator lenses 912B, 912G, and 912R, and three pair of multi-lenses 913B, 913G, and 913R.

The light source 911B is a solid-state light source for emitting the blue light beam BLs as the s-polarized light similarly to the light sources 211, 82B. The light source 911G is a solid-state light source for emitting the green light beam GLs as the s-polarized light similarly to the light source 82G. The light source 911R is a solid-state light source for emitting the red light beam RLs as the s-polarized light similarly to the light source 82R. The light sources 911B, 911G, and 911R are not limited to the semiconductor lasers, but can also be other solid-state light sources such as an LED. Further, the light sources 911B, 911G, and 911R are not limited to those for emitting the colored light beams as the s-polarized light with respect to the light modulation device 6, but can also be those for emitting the colored light beam as the p-polarized light with respect to the light modulation device 6.

Similarly to the collimator lenses 212, 83, the collimator lenses 912B, 912G, and 912R collimate the incident light to emit the result. The collimator lens 912B is disposed in the light path of the blue light beam BLs emitted from the light source 911B. The collimator lens 912G is disposed in the light path of the green light beam GLs emitted from the light source 911G. The collimator lens 912R is disposed in the light path of the red light beam RLs emitted from the light source 911R.

Similarly to the pairs of multi-lenses 214, 84, the pairs of multi-lenses 913B, 913G, and 913R are constituted by the incident side multi-lens 215 and the exit side multi-lens 216, and divide the light beam entering the incident side multi-lens 215 into a plurality of partial light beams. The pair of multi-lenses 913B are disposed between the collimator lens 912B and the light combining device 92. The pair of multi-lenses 913G are disposed between the collimator lens 912G and the light combining device 92. The pair of multi-lenses 913R are disposed between the collimator lens 912R and the light combining device 92. Further, the plurality of partial light beams of each of the colored light beams divided by the pairs of multi-lenses 913B, 913G, and 913R enters the color combining device 92.

It should be noted that in each of the pairs of multi-lenses 913B, 913G, and 913R, the incident side multi-lens 215 and the diffuser element 94 are in a conjugate relation. The shape of the blue light beam BLs entering the diffuser element 94 in a superimposed manner is defined by the shape of the small lens 2151 when viewing the incident side multi-lens 215 of the pair of multi-lenses 913B from the light incident side. Further, the shape of the green light beam GLs entering the diffuser element 94 in a superimposed manner is defined by the shape of the small lens 2151 when viewing the incident side multi-lens 215 of the pair of multi-lenses 913G from the light incident side. Similarly, the shape of the red light beam RLs entering the diffuser element 94 in a superimposed manner is defined by the shape of the small lens 2151 when viewing the incident side multi-lens 215 of the pair of multi-lenses 913R from the light incident side.

The color combining device 92 combines the blue light beam BLs, the green light beam GLs, and the red light beam RLs respectively emitted from the pairs of multi-lenses 913B, 913G, and 913R. The colored light beams combined with each other by the color combining device 92 are emitted to the light collection element 93 located at the +Z direction side of the color combining device 92. The color combining device 92 can be formed of, for example, a cross dichroic prism.

The light collection element 93 converges the colored light beams emitted from the color combining device 92 on the diffuser element 94 located at the +Z direction side of the light collection element 93. The light collection element 93 is formed of a single lens in the example shown in FIG. 13, but can also be constituted by a plurality of lenses similarly to the first light collection element 25 and the second light collection element 27.

The diffuser element 94 diffuses the light beam collected by the light collection element 93 and then emits the result toward the +Z direction. The diffuser element 94 has a rotary diffuser plate 941 for diffusing the incident light in the process of being transmitted toward the +Z direction, and a rotating section 942 for rotating the rotary diffuser plate 941 centering on a rotational axis along the +Z direction.

The rotary diffuser plate 941 has a conjugate relation with the incident side multi-lens 215 of each of the pairs of multi-lenses 913B, 913G, and 913R. The light beams each having a similar shape to the shape of the small lens 2151 when viewing the respective incident side multi-lenses 215 from the light incident side enter the rotary diffuser plate 941.

Further, the rotary diffuser plate 941 has a conjugate relation with the exit side lens array 43, and the shape of the light beam emitted from the rotary diffuser plate 941 is similar to the shape of the small lens 431 when viewing the exit side lens array 43 from the light incident side.

It should be noted that it is possible to adopt a configuration in which the rotary diffuser plate 941 is not rotated. In other words, it is also possible to adopt a configuration in which the diffuser element 94 is not provided with the rotating section.

The collimating element 95 collimates the colored light beams diffused in the diffuser element 94. The colored light beams collimated in the collimating element 95 enter the incident side lens array 42 constituting the pair of lens arrays 41 of the homogenization device 4 located at the +Z direction side of the collimating element 95.

As described above, the homogenization device 4 has the pair of lens arrays 41 constituted by the incident side lens array 42 and the exit side lens array 43, and the superimposing lens 44.

Out of these constituents, the incident side lens array 42 is in the conjugate relation with the light modulation device 6. The shape of the small lens 421 when viewing the incident side lens array 42 from the light incident side is similar to the shape of the modulation area MA in the light modulation device 6 viewed from the light incident side.

Further, the exit side lens array 43 is in a conjugate relation with the diffuser element 94. The shape of the small lens 431 when viewing the exit side lens array 43 from the light incident side is similar to the shape of the colored light beam entering the diffuser element 94 viewed from the light incident side. In other words, the shape of the small lens 431 when viewed from the light incident side is similar to the shape of the small lens 2151 when viewing the incident side multi-lens 215 from the light incident side.

Further, similarly to the projectors 1A, 1B, the partial light beam of each of the colored light beams emitted from the exit side lens array 43 enters the light modulation device 6 via the superimposing lens 44 and the field lens 5. The image modulated and then formed by the light modulation device 6 is projected by the projection optical device 7 on the projection target surface to thereby be displayed.

Advantages of Third Embodiment

According to the projector 1C related to the present embodiment described hereinabove, substantially the same advantages as those of the projectors 1A, 1B can be exerted.

For example, the illumination optical device 10C in the projector 1C is provided with the light source device 9, and the homogenization device 4 for substantially homogenously illuminating the modulation area MA as the illumination target area with the light beams emitted from the light source device 9.

The light source device 9 is provided with the light sources 911B, 911G, and 911R, the pairs of multi-lenses 913B, 913G, and 913R, and the diffuser element 94 as the optical element. The pair of multi-lenses 913B divide the blue light beam BLs emitted from the light sources 911B into the plurality of partial light beams (the first partial light beams). The same applies to the pairs of multi-lenses 913G, 913R. The pairs of multi-lenses 913B, 913G, and 913R are each provided with the incident side multi-lens 215 which is located at the light incident side, and has the plurality of small lenses 2151 as the plurality of first lenses, and the exit side multi-lens 216 which is located at the light exit side, and has the plurality of small lenses 2161 as the plurality of second lenses. The plurality of partial light beams enters the diffuser element 94 from each of the pairs of multi-lenses 913B, 913G, and 913R in a superimposed manner, and then the diffuser element 94 emits the diffused light based on the plurality of partial light beams of each of the colored light beams having entered the diffuser element 94. In other words, the diffuser element 94 diffuses the plurality of partial light beams of each of the blue light beam BLs, the green light beam GLs, and the red light beam RLs entering the diffuser element 94 in a superimposed manner, and then emits the result.

The homogenization device 4 is provided with the pair of lens arrays 41 for dividing the diffused light beam emitted from the diffuser element 94 into the plurality of partial light beams (the plurality of second partial light beams), and the superimposing lens 44 for superimposing the plurality of partial light beams on the modulation area MA as the illumination target area. The pair of lens arrays 41 are provided with the incident side lens array 42 which is located at the light incident side, and has the plurality of small lenses 421 as the plurality of third lenses, and the exit side lens array 43 which is located at the light exit side, and has the plurality of small lenses 431 as the plurality of fourth lenses.

The incident side multi-lens 215 of each of the pairs of multi-lenses 913B, 913G, and 913R and the diffuser element 94 are in the conjugate relation. The diffuser element 94 and the exit side lens array 43 are in the conjugate relation.

In each of the pairs of multi-lenses 913B, 913G, and 913R, the shape of each of the small lenses 2151 as the plurality of first lenses and the shape of each of the small lenses 431 as the plurality of fourth lenses are in a similarity relationship.

According to such a configuration, it is possible to make the partial light beams entering the small lenses 431 of the exit side lens array 43 become the partial light beams each having the shape corresponding to the shape of the small lens 431. Thus, it is possible to reduce the amount of the light failing to enter the small lenses 431 of the exit side lens array 43. Therefore, it is possible to reduce the light intensity of the light beam failing to enter the light modulation device 6 out of the light beams emitted from the light sources 911B, 911G, and 911R, and it is possible to increase the use efficiency of the light beams emitted from the light sources 911B, 911G, and 911R.

Further, since it is possible to enlarge the secondary light source image formed in the exit side lens array 43, it is possible to prevent the speckle noise from occurring in the projection image.

Further, the exit side lens array 43 and the diffuser element 94 are in the conjugate relation, and the diffuser element 94 and each of the incident side multi-lenses 215 are in the conjugate relation. Further, the shape of each of the small lenses 2151 when viewed from the light incident side and the shape of each of the small lenses 431 when viewed from the light incident side are similar to each other.

According to the above, it is possible to enlarge the light beam entering the diffuser element 94 compared to when the illumination optical device 10C is provided with the polarization conversion element PC, and the light beam having a square shape is made to enter each of the small lenses 431 of the exit side lens array 43. Therefore, it is possible to decrease the light density of the light beam entering the diffuser element 94, and thus the deterioration of the diffuser element 94 can be suppressed.

It should be noted that the light source device 9 emits the light beams as a single-species linearly polarized light similarly to the light source devices 2, 8. Therefore, since there is no need to dispose the polarization conversion element PC described above, it is possible to prevent an increase in the number of components of the light source device 9, and by extension, an increase in the number of components of the illumination optical device 10C. Besides the above, it is possible to promote the reduction in size of the light source device 9, and by extension, the reduction in size of the illumination optical device 10C.

Modifications of Embodiments

The present disclosure is not limited to each of the embodiments described above, but includes modifications, improvements, and so on within the range in which the advantages of the present disclosure can be achieved.

In the first and second embodiments described above, it is assumed that the light source device 2, 8 emits the green light beam GLs as the first colored light beam L1, emits the red light beam RLs as the second colored light beam L2, and emits the blue light beam BLs as the third colored light beam L3. Further, it is assumed that the light source device 2 emits the yellow light beam YLs or the green light beam GLs as the fourth colored light beam L4, and the light source device 8 emits the green light beam GLs as the fourth colored light beam L4. However, the first through fourth colored light beams L1 through L4 emitted by the light source devices 2, 8 are not limited to these colored light beams. For example, the first colored light beam L1 is not required to be the green light beam, the second colored light beam L2 is not required to be the red light beam, and the third colored light beam L3 is not required to be the blue light beam. Further, the fourth colored light beam L4 is not required to be the yellow light beam, but can also be the red light beam instead of the green light beam.

Further, the number of the colored light beams which are spatially separated and then emitted by the light source device 2, 8 can be no larger than three, or can also be no smaller than five.

In the first and second embodiments described above, it is assumed that the plurality of colored light beams emitted by the light source device 2, 8 is the colored light beams as the s-polarized light. In the third embodiment described above, it is assumed that the light beams emitted by the light source device 9 are the light beams as the s-polarized light. However, this is not a limitation, and the light beams emitted by the light source device 2, 8, or 9 can be the light beams as the p-polarized light as described above. Furthermore, the light beams emitted by the light source device in the illumination optical device according to the present disclosure are not required to be the single-species polarized light with the polarization state uniformed, but can be light beams including the s-polarized light and the p-polarized light mixed with each other, or can also be light beams including circularly polarized light.

In the first embodiment described above, it is assumed that the direction in which the light source device 2 emits the light beams is defined as the +Z direction, and out of the +X direction and the +Y direction as the two directions perpendicular to the +Z direction and perpendicular to each other, the +Y direction is defined as the upward direction in the projector 1A. Further, it is assumed that the +X direction is defined as the first direction, and the −Z direction is defined as the second direction. However, this is not a limitation, but, for example, the first direction can be any one of the −X direction, the +Y direction, and the −Y direction. The same is also applied to the projectors 1B, 1C.

In the first embodiment described above, the first reflecting element 26 for diffusing the incident light beam and then emitting the result, and the wavelength conversion element 28 for diffusing the converted light beam as the light beam longer in wavelength than the incident light beam and then emitting the result are adopted as the optical elements for emitting the diffused light beam based on the plurality of partial light beams entering the optical element in a superimposed manner. In the second and third embodiments described above, the diffuser elements 86, 94 for diffusing the incident light in the process of being transmitted are adopted as the optical elements. However, this is not a limitation, it is possible to adopt substantially the same diffuser element as the diffuser elements 86, 94 in the light source device 2, and it is also possible to adopt substantially the same diffuser element as the first reflecting element 26 in the light source devices 8, 9. Further, the wavelength conversion element 28 as the optical device is not limited to the reflective wavelength conversion element, but can be a transmissive wavelength conversion element.

In the first embodiment described above, the configuration of the light source device 2 is referred to in FIGS. 3 through 5 described above, but the configuration of the light source device to which the present disclosure can be applied is not limited to the configuration described above. In other words, the present disclosure can be applied to any light source devices for emitting a plurality of colored light beams spatially separated from each other.

For example, it is assumed that the light source section 21 emits the blue light beams BLs, BLp in the +X direction. However, this is not a limitation, and it is also possible that the light sources 211 emit the blue light beams BLs, BLp in a direction crossing the +X direction, and the blue light beams BLs, BLp are reflected toward the +X direction by a reflecting member so as to enter the first polarization split element 22 in the +X direction.

In the second embodiment described above, the configuration of the light source device 8 is referred to in FIG. 10 and FIG. 11 described above, and in the third embodiment described above, the configuration of the light source device is referred to in FIG. 13 described above, but the configuration of the light source device to which the present disclosure can be applied is not limited to the configurations described above.

In each of the embodiments described above, it is assumed that the light source devices 2, 8, and 9 each have the chassis CA as the light source device chassis. However, this is not a limitation, and the chassis CA can be eliminated. In this case, it is sufficient to define an imaginary orthogonal plane with respect to the +Z direction in which the colored light beams are emitted as the exit surface, and define the positions at which the first through fourth colored light beams pass through the imaginary orthogonal plane as the first through fourth exit positions, for example, in the light source device 2, 8.

In the first embodiment described above, it is assumed that the shape of the wavelength conversion element 28 when viewed from the light incident side is similar to the shape of the light beam entering the wavelength conversion element 28 when viewed from the light incident side. Further, it is assumed that the size of the wavelength conversion element 28 when viewed from the light incident side substantially coincides with the beam diameter of the light beam entering the wavelength conversion element 28 when viewed from the light incident side. However, this is not a limitation, and the shape of the wavelength conversion element 28 when viewed from the light incident side is not required to be similar to the shape of the light beam entering the wavelength conversion element 28 when viewed from the light incident side. Further, the size of the wavelength conversion element 28 when viewed from the light incident side is not required to substantially coincide with the beam diameter of the light beam entering the wavelength conversion element 28 when viewed from the light incident side. In other words, the size of the wavelength conversion element 28 when viewed from the light incident side can be larger than the beam diameter of the light beams entering the wavelength conversion element 28. Further, it is also possible for the wavelength conversion element 28 to have a configuration of being rotated centering on the rotational axis parallel to the +Z direction as described above.

In each of the embodiments described above, it is assumed that the shape of the small lens 421 of the incident side lens array 42 when viewed from the light incident side is similar to the shape of the modulation area MA in the light modulation device 6 when viewed from the light incident side. However, this is not a limitation, but the shape of the small lens 421 and the shape of the modulation area MA are not necessarily required to be similar to each other. Similarly, the shape of the small lens 2151 as the first lens and the shape of the modulation area MA are not necessarily required to be similar to each other.

In each of the embodiments described above, it is assumed that the incident side multi-lens 215 and the exit side multi-lens 216 have the same configuration. In other words, it is assumed that the incident side multi-lens 215 and the exit side multi-lens 216 are the same multi-lenses. However, this is not a limitation, and it is possible for the incident side multi-lens 215 and the exit side multi-lens 216 to have respective configurations different from each other.

Further, it is assumed that the incident side lens array 42 and the exit side lens array 43 have the same configuration. However, this is not a limitation, and it is possible for the incident side lens array 42 and the exit side lens array 43 to have respective configurations different from each other.

In each of the embodiments described above, it is assumed that the small lenses 2151, 2161, 421, and 431 are formed to have the rectangular shape shorter in the +Y direction, and the light modulation device 6 has the modulation area MA having a rectangular shape shorter in the +Y direction. However, this is not a limitation, and when the modulation area MA of the light modulation device 6 has a square shape, it is possible for the shape of each of the small lenses 2151, 2161, 421, and 431 when viewed from the light incident side to have the square shape.

In each of the embodiments described above, it is assumed that the light source devices 2, 8, and 9 are each for emitting the light beams which enter the light modulation device 6 having the liquid crystal panel 61 and the microlens array 62. However, this is not a limitation, and the configuration of the light modulation device illuminated by the light source device according to the present disclosure is not limited to the above. The same applies to the illumination optical devices 10A, 10B, and 10C.

Further, the illumination optical device according to the present disclosure is not limited to the light source device adopted in the projector, but can be a device to be used for other purposes.

What is claimed is:

1. An illumination optical device comprising:
a light source device; and
a homogenization device configured to substantially homogenously illuminate an illumination target area with a light beam emitted from the light source device, wherein
the light source device includes
a light source,
a pair of multi-lenses configured to divide a light beam emitted from the light source into a plurality of first partial light beams, and
an optical element which the plurality of first partial light beams enters in a superimposed manner, and which is configured to emit a diffused light beam,
the pair of multi-lenses include
an incident side multi-lens located at a light incident side and having a plurality of first lenses, and
an exit side multi-lens located at a light exit side and having a plurality of second lenses,
the homogenization device includes
a pair of lens arrays configured to divide the diffused light beam emitted from the optical element into a plurality of second partial light beams, and
a superimposing lens configured to superimpose the plurality of second partial light beams in the illumination target area,
the pair of lens arrays include
an incident side lens array located at a light incident side and having a plurality of third lenses, and
an exit side lens array located at a light exit side and having a plurality of fourth lenses,
the incident side multi-lens and the optical element are in a conjugate relation,
the optical element and the exit side lens array are in a conjugate relation, and
a shape of each of the first lenses and a shape of each of the fourth lenses are in a similarity relationship,
the light source device further includes
a first polarization split element configured to transmit a first polarization component toward a first direction, and reflect a second polarization component toward a second direction perpendicular to the first direction out of a source light beam which is emitted from the light source, and enters the first polarization split element along the first direction via the pair of multi-lenses,
a second polarization split element located at the first direction side of the first polarization split element, and configured to reflect the first polarization component of the source light beam entering the second polarization split element in the first direction toward the second direction,
a first reflecting element located at the second direction side of the first polarization split element, and configured to reflect the source light beam entering the first reflecting element toward an opposite direction to the second direction,
a first retardation element located between the first polarization split element and the first reflecting element in the second direction, and configured to convert a polarization state of the source light beam,
a wavelength conversion element located at the second direction side of the second polarization split element, and configured to emit a converted light beam as unpolarized light, which is obtained by performing wavelength conversion on the first polarization component of the source light beam entering the wavelength conversion element in the second direction, toward the opposite direction to the second direction,
a second retardation element which is a ½ wave plate which is located at the opposite direction side to the second direction side of the second polarization split element, and which the converted light beam transmitted through the second polarization split element enters,
a first color separation element located at the opposite direction side to the second direction side of the second retardation element, and configured to separate the converted light entering the first color separation element from the second retardation element into a first colored light beam and a second colored light beam,
a second color separation element located at the opposite direction side to the second direction side of the first polarization split element, and configured to separate a light beam entering the second color separation element in the opposite direction to the second direction from the first polarization split element into a third colored light beam and a fourth colored light beam, and
a third retardation element which is a ½ wave plate located in a light path of the third colored light beam separated by the second color separation element,
the second polarization split element transmits the first polarization component of the converted light beam in the opposite direction to the second direction to make the first polarization component enter the second retardation element, and reflects the second polarization component of the converted light beam toward an opposite direction to the first direction out of the converted light beam entering the second polarization split element in the opposite direction to the second direction,
the first polarization split element transmits the first polarization component of the source light beam entering the first polarization split element in the opposite direction to the second direction toward the opposite direction to the second direction to thereby make the first polarization component enter the second color separation element, and reflects the second polarization component of the converted light beam entering the first polarization split element in the opposite direction to the first direction toward the opposite direction to the second direction to thereby make the second polarization component enter the second color separation element,
the first color separation element emits a first color component included in the second polarization component of the converted light beam entering the first color separation element from the second retardation element as the first colored light beam, and emits a second color component included in the second polarization component of the converted light beam as the second colored light beam,
the second color separation element emits the first polarization component of the source light beam entering the second color separation element from the first polarization split element to the third retardation element as the third colored light beam, and emits the second polarization component of the converted light beam entering the second color separation element from the first polarization split element as the fourth colored light beam, and the first reflecting element and the wavelength conversion element are each the optical element.

2. The illumination optical device according to claim 1, wherein the optical element is a diffuser element configured to emit the diffused light beam obtained by diffusing an incident light beam.

3. The illumination optical device according to claim 1, wherein the optical element is a wavelength conversion element which includes a phosphor material, and is configured to emit the diffused light beam longer in wavelength than an incident light beam.

4. The illumination optical device according to claim 3, wherein a shape of the wavelength conversion element when viewed from the light incident side has a similarity relationship with a shape of a light beam entering the wavelength conversion element when viewed from the light incident side, and a size of the wavelength conversion element when viewed from the light incident side substantially coincides with a beam diameter of a light beam entering the wavelength conversion element when viewed from the light incident side.

5. The illumination optical device according to claim 1, wherein a shape of each of the first lenses and a shape of each of the second lenses are in a similarity relationship, and a shape of each of the third lenses and a shape of each of the fourth lenses are in a similarity relationship.

6. The illumination optical device according to claim 5, wherein the incident side multi-lens and the exit side multi-lens are multi-lenses having a same configuration, and the incident side lens array and the exit side lens array are lens arrays having a same configuration.

7. A projector comprising:

the illumination optical device according to claim 1;

a light modulation device having a modulation area configured to modulate the light beam emitted from the illumination optical device; and a projection optical device configured to project the light beam modulated by the light modulation device, wherein the modulation area is the illumination target area.

8. The projector according to claim 7, wherein a shape of the modulation area has a similarity relationship with a shape of each of the first lenses.

* * * * *